United States Patent
Dreps et al.

(10) Patent No.: US 6,334,163 B1
(45) Date of Patent: Dec. 25, 2001

(54) ELASTIC INTERFACE APPARATUS AND METHOD THEREFOR

(75) Inventors: Daniel Mark Dreps, Georgetown, TX (US); Frank David Ferraiolo, Essex, VT (US); Kevin Charles Gower, LaGrangeville, NY (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/263,661

(22) Filed: Mar. 5, 1999

(51) Int. Cl.[7] .................................................. G06F 13/00
(52) U.S. Cl. ............................................. 710/129; 710/60
(58) Field of Search ................................... 710/129, 130, 710/60; 713/600

(56) References Cited

U.S. PATENT DOCUMENTS

| | | | |
|---|---|---|---|
| 5,229,668 | | 7/1993 | Hughes, Jr. et al. ................ 307/605 |
| 5,394,106 | * | 2/1995 | Black et al. ......................... 327/107 |
| 5,424,996 | * | 6/1995 | Martin et al. ....................... 365/233 |
| 5,432,823 | * | 7/1995 | Gasbarro et al. ................... 375/356 |
| 5,509,038 | * | 4/1996 | Wicki .................................. 375/371 |
| 5,560,017 | * | 9/1996 | Barrett et al. ...................... 710/260 |
| 5,598,113 | * | 1/1997 | Jex et al. ............................. 326/94 |
| 5,680,486 | * | 10/1997 | Mita et al. .......................... 382/282 |
| 5,692,216 | * | 11/1997 | Wolford et al. .................... 713/600 |
| 5,835,729 | * | 11/1998 | Moreton et al. .................... 709/246 |
| 5,838,936 | | 11/1998 | Chau et al. ......................... 395/309 |
| 5,867,541 | | 2/1999 | Tanaka et al. ...................... 375/354 |
| 5,915,105 | * | 6/1999 | Farmwald et al. ................. 365/233 |
| 5,915,128 | * | 6/1999 | Bauman et al. .................... 710/60 |
| 6,031,847 | | 2/2000 | Collins et al. ...................... 370/508 |
| 6,041,417 | * | 3/2000 | Hammond et al. ................ 713/400 |

* cited by examiner

*Primary Examiner*—Paul R. Myers
(74) *Attorney, Agent, or Firm*—Barry S. Newberger; Winstead Sechrest & Minick P.C.; Mark McBurney

(57) ABSTRACT

An elastic interface apparatus and method are implemented. The elastic interface includes a plurality of storage units for storing for storing a stream of data values, wherein each storage unit sequentially stores members of respective sets of data values. Each data value is stored for a predetermined number of periods of a local clock. Selection circuitry may be coupled to the storage units to select the respective data value from the data stream for storage in the corresponding storage unit. Data is sequentially output from each storage unit in synchrony with the local clock on a target cycle of the local clock.

29 Claims, 18 Drawing Sheets

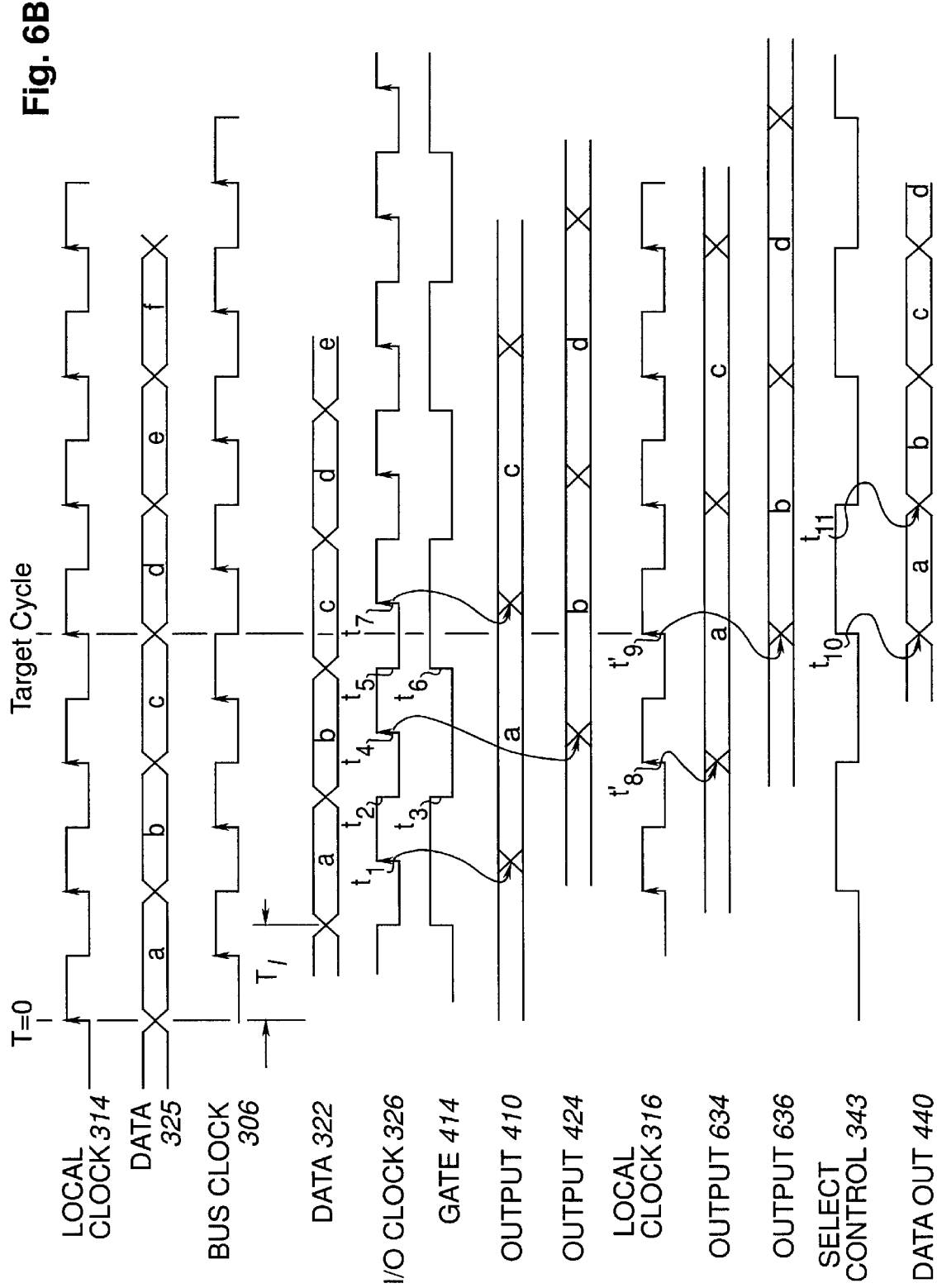

ELASTIC INTERFACE APPARATUS AND METHOD THEREFOR

CROSS REFERENCE TO RELATED APPLICATIONS

The present invention is related to the following U.S. patent applications which are hereby incorporated herein by reference:

Ser. No. 09/263,671 entitled "Programmable Delay Element", and

Ser. No. 09/263,662 entitled "Dynamic Wave Pipelined Interface Apparatus and Method Therefor"

TECHNICAL FIELD

The present invention relates in general to data processing systems, and in particular, to the interface between dynamic, or clocked, integrated circuit chips in a data processing system.

BACKGROUND INFORMATION

Modern data processing systems require the transfer of data between dynamic, or clocked, circuits embodied in multiple chips in the system. For example, data may need to be transferred between central processing units (CPUs) in a multi-CPU system, or between a CPU and the memory system which may include a memory controller and off-chip cache. Data transfers are synchronous, and data is expected to be delivered to the circuitry on the chip on a predetermined system cycle. As CPU speeds have increased, the speed of the interface between chips (bus cycle time) has become the limiting constraint as the latency across the interface exceeds the system clock period. In order to maintain system synchronization, the system designer must slow the speed of the bus in order that the cycle on which data arrives be unambiguous.

This may be further understood by referring to FIG. 1A, in which is depicted, in block diagram form, a prior art interface between two integrated circuit chips, chip 102 and chip 104 in a data processing system. Each of chips 102 and 104 receive a reference clock 106 coupled to a phase lock loop, PLL 108. PLL 108 generates a local clock, clock 110 in chip 102 and clock 111 in chip 104, locked to reference clock 106. Reference clock 106 provides a "time zero" reference, and may be asserted for multiple periods of local clocks 110 and 111, depending on the multiplication of PLL 108. The bus clock 113 is derived from reference clock 106 by dividing local clock 110 by a predetermined integer, N, in divider 112. Data to be sent from chip 102 to chip 104 is latched on a predetermined edge of the divided local clock 110 and driven on to data line 116 via driver 118. Data is received at receiver (RX) 120 and captured into destination latch 122 on a predetermined edge of the divided local clock 111 in chip 104. Due to the physical separation of chip 102 and chip 104, the data appears at input 124 of destination latch 122 delayed in time. (The contribution of RX 120 to the latency is typically small relative to the delay due to the data transfer.) The time delay is referred to as the latency, and will be discussed further in conjunction with FIG. 1B.

Similarly, chip 104 sends data to chip 102 via data line 126. Data to be sent from chip 104 is latched in latch 128 on a predetermined edge of the output signal from divider 130 which divides local clock 111 by N. The data is driven onto data line 126 via driver 132 and captured on destination latch 134 via receiver 136. The data input to chip 102 is captured into data latch 134 on a predetermined edge of an output of divider 130 which also divides local clock 110 by N.

In FIG. 1B, there is illustrated an exemplary timing diagram for interface 100 of FIG. 1A, in accordance with the prior art. Data 115 sent from chip 102 to chip 104 is latched, in latch 114, on a rising edge, $t_1$, of bus clock 113. Bus clock 113 is generated by dividing local clock 110 by N in dividers 112 and 130 in chip 102. Following a delay by the latency, $T_1$, data 117 appears at an input to destination latch 122, and is latched on rising edge $t_2$ of bus clock 123. Bus clock 123 is generated by dividing local clock 111 by N in dividers 112 and 130 in chip 104. Thus, in the prior art in accordance with FIG. 1B, data 125 appears in chip 104 one bus cycle following its launch from chip 102. In FIG. 1B, there is zero skew between bus clock 113 and bus clock 123.

If, in interface 100 in FIG. 1A, the bus clock speed is increased, the latency may exceed one bus clock cycle. Then the exemplary timing diagram illustrated in FIG. 1C may result. As before, data 115 has been latched on edge $t_1$ of bus clock 113. Data 117 appears at input 124 of destination latch 122 after latency time, $T_1$ which is longer than the period of bus clock 113 and bus clock 123. Data 117 is latched on edge $T_3$ of bus clock 123 in chip 104 to provide data 125 on chip 104. If interface 100 between chips 102 and 104 represents the interface having the longest latency from among a plurality of interfaces between chip 102 and the plurality of other chips within a data processing system, then the two cycle latency illustrated in FIG. 1C represents the "target" cycle for the transmission and capture of data between chips, such as chip 102 and chip 104. The target cycle is the predetermined cycle at which data is expected by the chip. Interfaces having a shorter latency may need to be padded, in accordance with the prior art, in order to ensure synchronous operation. The padding ensures that faster paths in interface 100 have latencies greater than one bus clock cycle and less than two bus clock cycles, whereby data synchronization may be maintained.

This may be further understood by referring now to FIG. 1D, illustrating a plurality 101 of chips, chips 102, 103 and 104. Chip 102 and chip 104 are coupled on "slow" path 152 having a long latency, $T_S$. Chip 103 is coupled to chip 102 via "fast" path 154 having a short latency period, $T_F$. A "nominal" path coupling plurality 101 of chips 102–105 has latency $T_M$, such as the latency on path 156 between chip 102 and chip 105.

The timing diagram in FIG. 1E provides further detail. FIG. 1E illustrates a timing diagram similar to that in FIG. 1C in which the target cycle for the capture of data into a receiving chip is two bus cycles. In FIG. 1E, the nominal latency, $T_M$, is shown to be 1.5 bus cycles, the fast path latency, $T_F$, is illustrated to be just greater than one bus cycle, and the slow path latency, $T_S$, is shown to be slightly less than two bus cycles. In this case, each of the plurality of chips 101 in FIG. 1D capture data on the target cycle, two bus cycles after data launch.

If, however, the fast path is shorter, illustrated by fast path latency $T'_F$ data synchronization is lost. In this case, data arrives at chip 103 prior to transition $T_2$ of the chip 103 bus clock as illustrated by the dotted portion of data 117 at chip 103, and is latched into chip 103 after one bus cycle. This is illustrated by the dotted portion of data 125 in chip 103. In order to restore synchronization, the fast path, path 154, between chips 102 and 103 would require padding to increase the fast path latency, from $T'_F$ to $T_F$. Consequently, the timing of such a prior art interface is tuned to a specific operating range, a particular interface length, and is valid only for the technology for which the design was timed and analyzed.

Likewise, increasing the clock speed of the chips in FIG. 1D will result in a loss of synchronization. This may be understood by considering an explicit example. The local clock cycle time is first taken have a 1 nanosecond (ns) period. The bus clock will have a period that is a fixed multiple, which will be taken to be two, of the local clock. Let the nominal latency of the interface, $T_M$, be 3 ns with ±0.99 ns of timing variation, i.e. the best case or fast path, $T_F$, is 2 ns and the worse case, or slow path, $T_S$, is 4 ns. The data will arrive after two ns and before four ns. Hence the interface will operate under all conditions i.e. data is guaranteed to arrive after the first bus cycle and before the second bus cycle. However if the speed of the chips is increased to a 0.9 ns cycle time, the bus cycle time is changed to 1.8 ns. In order to ensure enough time for the data to propagate across the interface under worse case conditions the data must not be captured before 2.5 bus cycles, or 4.5 ns, because two bus cycles is less than the slow path time, $T_S$, or 4 ns. Then, in order to operate a 1.8 ns bus cycle, the fastest data can arrive is 1.5*1.8=2.7 ns (one bus cycle earlier), to ensure data arrives on the same cycle for all conditions. However, the earliest data can arrive from the above latency numbers is via the fast path with a $T_F$ of 3 ns−0.99 ns=2.01 ns. Thus, operating at a bus cycle time of 1.8 ns cannot be supported in a conventional synchronous design. In order to operate synchronously, the bus to processor ratio must be slowed to at least 3:1 and operate at a 2.7 ns cycle time (2.7 ns*1.5 cycles=4.05ns and 2.7nS*0.5 cycles=1.35ns) which militates against the increase in local clock speed.

Thus, there is a need in the art for apparatus and methods to accommodate data transfers between chips in a data processing system having increasing clock speeds. In particular, there is a need for methods and apparatus to ensure data synchronization between chips in data processing systems in which path latencies vary over more than one bus cycle, and in which the need for design specific hardware padding is eliminated.

SUMMARY OF THE INVENTION

The aforementioned needs are addressed by the present invention. Accordingly there is provided, in a first form, an apparatus for implementing an elastic interface. The apparatus includes a first storage device operable for storing a first set of data values and a second storage device operable for storing a second set of data values. Circuitry coupled to said first and second storage devices is operable for sequentially outputting a first data value from said first storage device and a second data value from said second storage device in response to at least one control signal, wherein said first and second storage devices hold data values for a predetermined number of cycles of a first clock.

There is also provided, in a second form, a method of interfacing integrated circuit devices. The method includes the steps of storing a first set of data values in a first storage element, wherein each data value of said first set is stored for a predetermined number of cycles of a first clock and storing a second set of data values in a second set of storage elements wherein each data value of said second set is stored for a predetermined number of cycles of a first clock; a first data value from said first storage device and a second data value from said second storage device are sequentially output in response to at least one control signal.

Additionally, there is provided, in a third form, a data processing system having a first data processing device and a second data processing device coupled to said first data processing device via an elastic interface. The elastic interface contains a first storage device operable for storing a first set of data values, a second storage device operable for storing a second set of data values, and circuitry coupled to said first and second storage devices operable for sequentially outputting a first data value from said first storage device and a second data value from said second storage device in response to at least one control signal, wherein said first and second storage devices hold data values for a predetermined number of cycles of a first clock.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 6B schematically illustrates a timing diagram of the elastic interface of FIG. 5A;

DETAILED DESCRIPTION

Figure 1A:
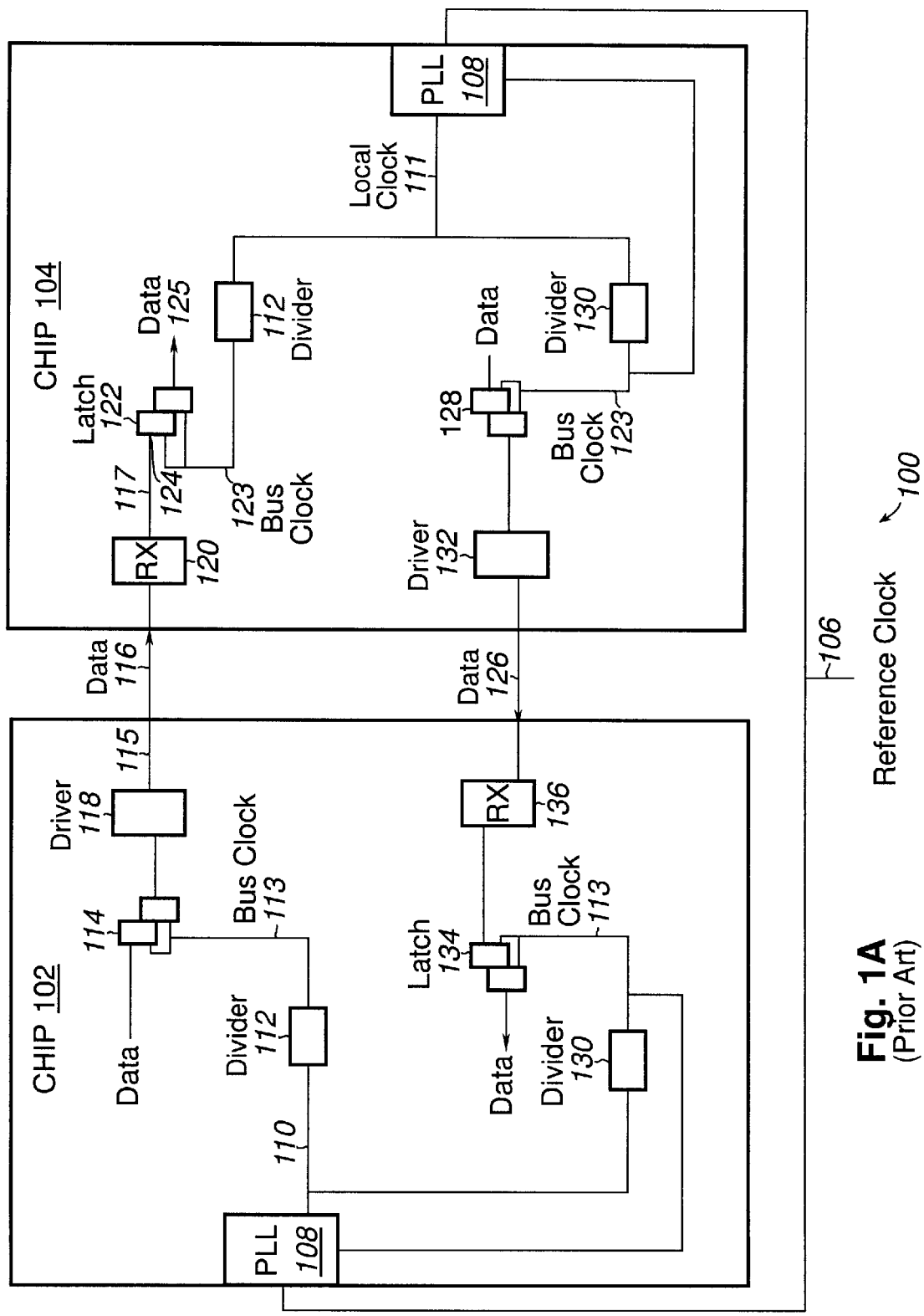
FIG. 1A illustrates a chip interface in accordance with the prior art.
Figure 1B:
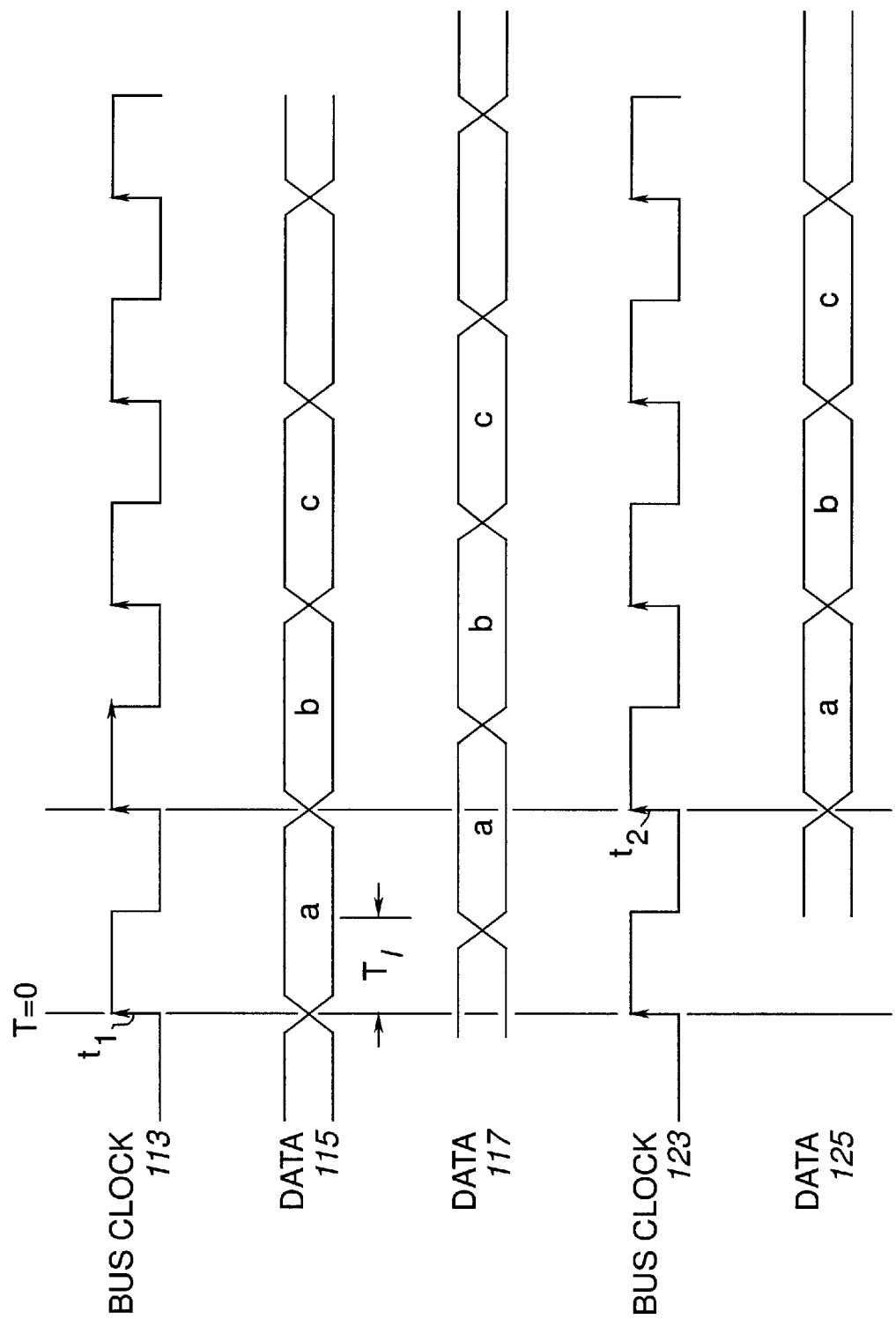
FIG. 1B schematically illustrates a timing diagram for an embodiment of the chip interface of FIG. 1A, in accordance with the prior art.
Figure 1C:
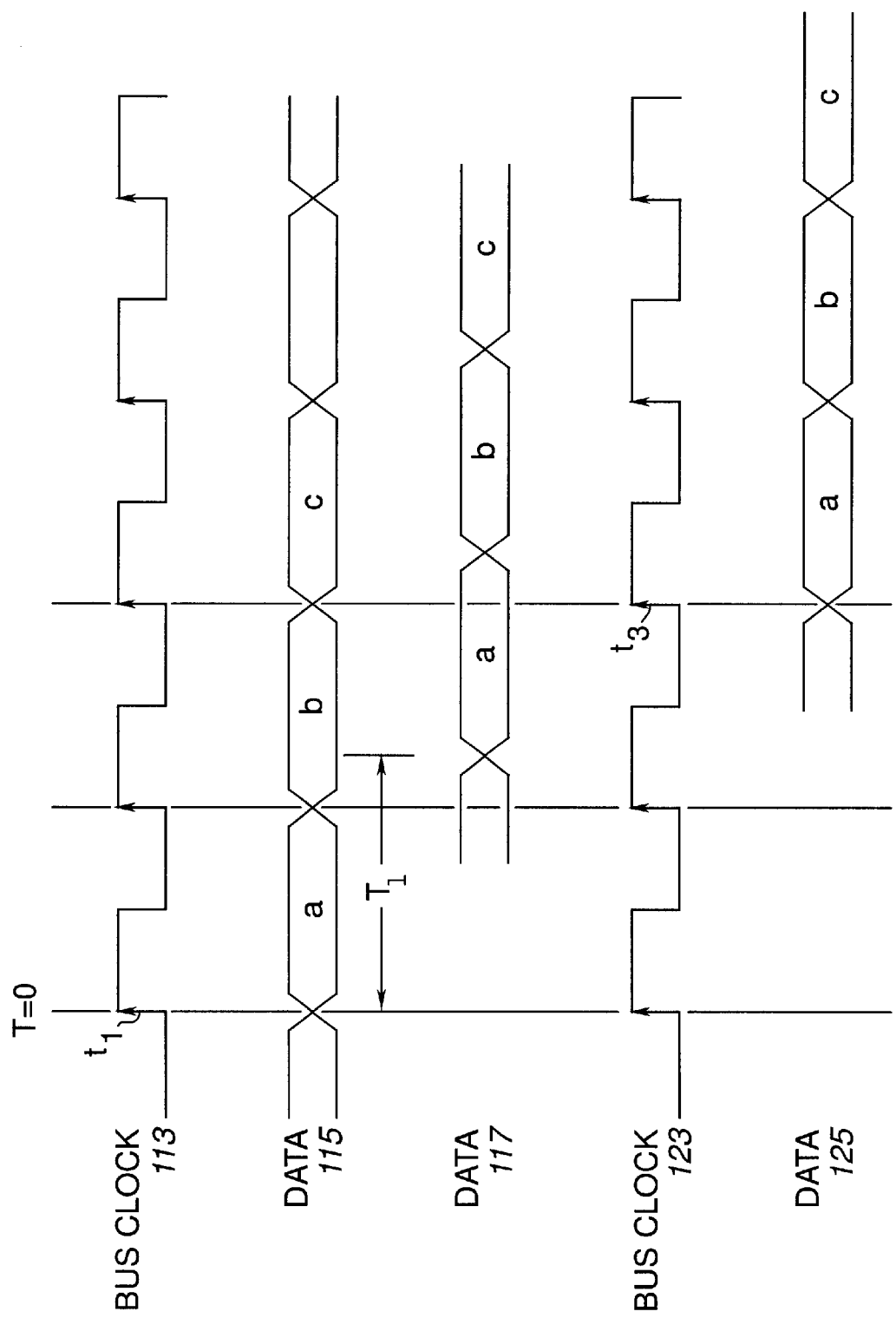
FIG. 1C illustrates a timing diagram for another embodiment of the chip interface of FIG. 1A, according to the prior art.

The present invention provides an elastic interface mechanism that implements data synchronization among a plurality of data processing chips in a data processing system. Data synchronization is accomplished without the need for padding which otherwise complicates the physical wiring, and adds complexity to the hardware design. The "elasticity" of the interface accounts for the physical difference between paths coupling the data processing chips in the system. By capturing the received data into a plurality of storage elements, and selectively steering the latched data, data synchronization is provided in a data processing system having latencies that vary by more than one bus clock cycle. Synchronization may be established dynamically by performing an initialization alignment procedure, on power-up or following a reset. In this way, synchronization of data may be accomplished in accordance with the principles of the present invention without the need for a timing analysis of the board design and fast path padding.

In the following description, numerous specific details are set forth such as bus clock frequencies and synchronization cycles, clock edges, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

Refer now to FIGS. 2–8B wherein depicted elements are not necessarily shown to scale and wherein like or similar elements are designated by the same reference numeral through the several views.

Figure 2:
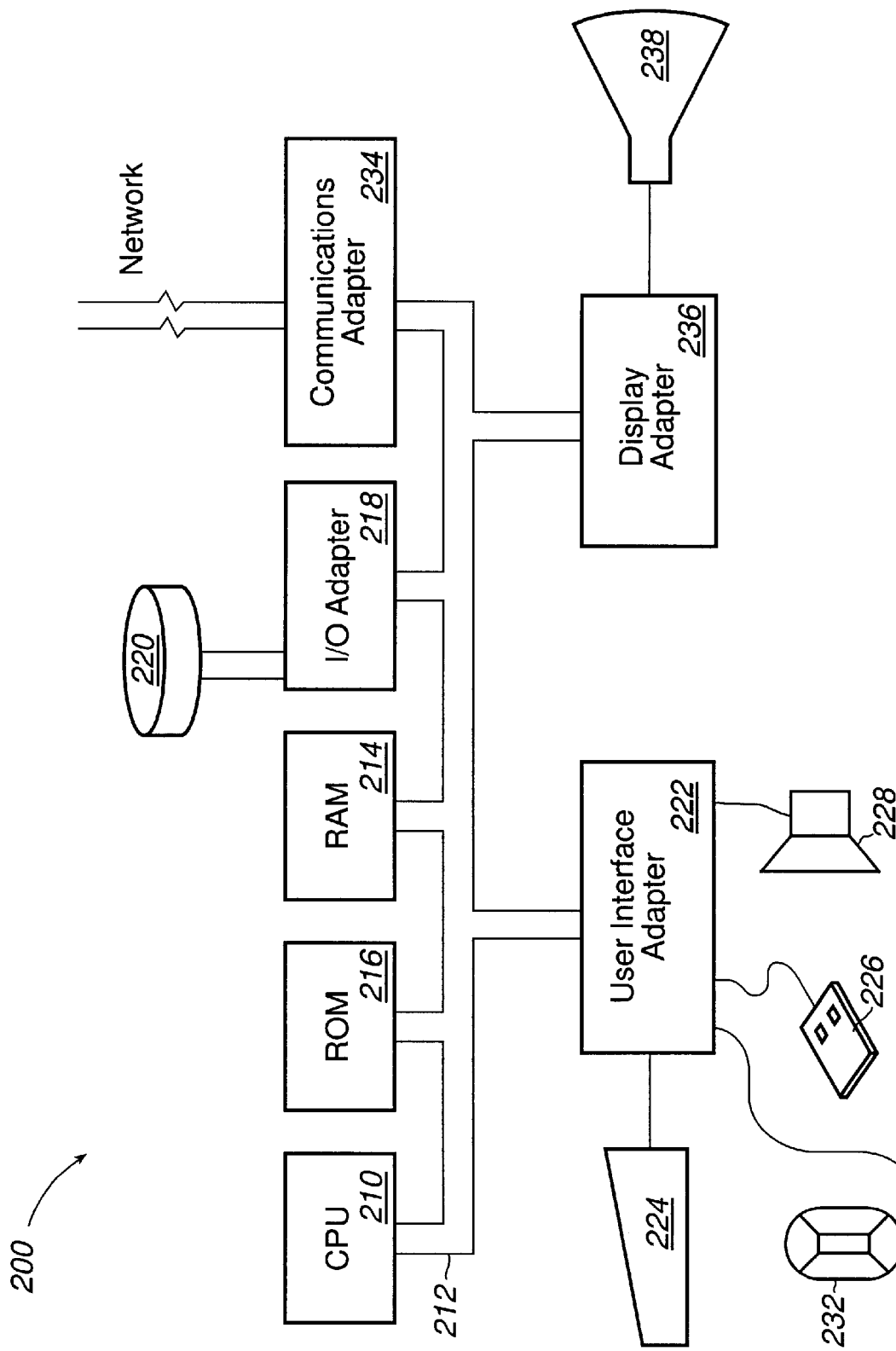
FIG. 2 illustrates, in block diagram form, a representative hardware environment for practicing the invention.

A representative hardware environment for practicing the present invention is depicted in FIG. 2, which illustrates a typical hardware configuration of data processing system 213 in accordance with the subject invention having central processing unit (CPU) 210, such as a conventional microprocessor, and a number of other units interconnected via system bus 212. Data processing system 213 includes random access memory (RAM) 214, read only memory (ROM) 216, and input/output (I/O) adapter 218 for connecting peripheral devices such as disk units 220 and tape drives 240 to bus 212, user interface adapter 222 for connecting keyboard 224, mouse 226, and/or other user interface devices such as a touch screen device (not shown) to bus 212, communication adapter 234 for connecting workstation 213 to a data processing network, and display adapter 236 for connecting bus 212 to display device 238. CPU 210 may include other circuitry not shown herein, which will include circuitry commonly found within a microprocessor, e.g., execution unit, bus interface unit, arithmetic logic unit, etc. The interface of the present invention may be included in CPU 210. Additionally, the present invention may be incorporated into storage devices, such as RAM 214 (which may include memory control circuitry, not shown herein). CPU 210 may also reside on a single integrated circuit.

Figure 3:
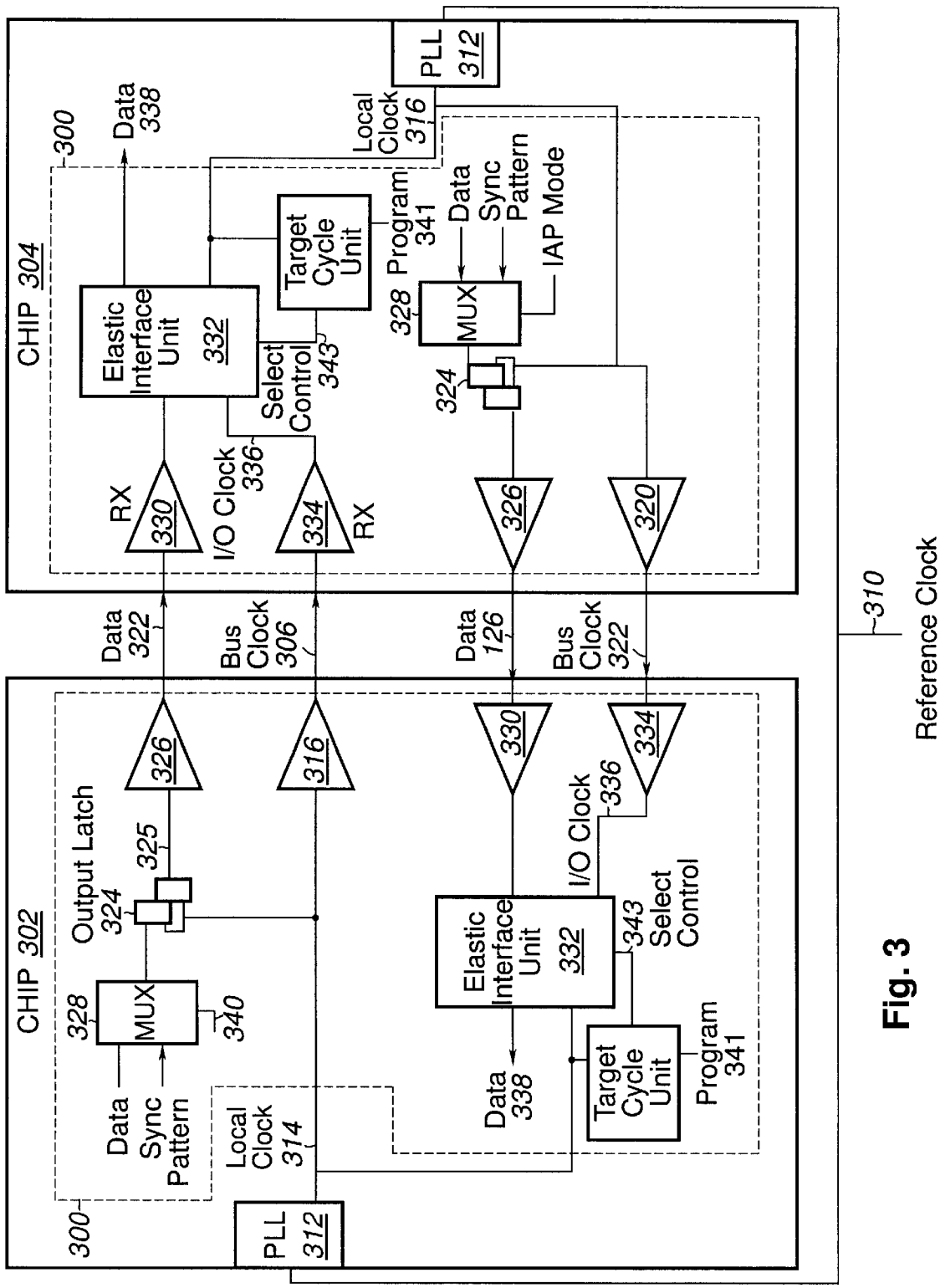
FIG. 3 illustrates, in block diagram form, a chip interface in accordance with an embodiment of the present invention.

Refer now to FIG. 3 in which is illustrated an interface 300 in accordance with the present invention. Interface 300 is incorporated in each of chip 302 and chip 304 which communicate data with each other via a respective interface 300. (Although the embodiment of the present invention is described in the context of a chip to chip interface, the principals of the present invention may be embodied in an interface between any pair of clocked latches.) Data is transferred between chips 302 and 304 at a rate determined by a bus clock, bus clocks 306 and 308. Bus clocks 306 and 308 are nominally the same frequency, and are derived from reference clock 3 10 provided to a PLL, PLL 312 in each of chips 302 and 304. In an embodiment of the present invention, reference clock 310 may be a system clock. Each of PLL 312 outputs a local clock, local clock 314 in chip 302 and local clock 316 in chip 304 which is locked in phase to reference clock 310, and may be a preselected integer, M, multiple of the period of reference clock 310. Local clock 314 is buffered by driver 318 to provide bus clock 306 from chip 302. Similarly, local clock 316 is buffered by driver 320 to provide bus clock 308 from chip 304.

The bus clock is provided along with the data communicated from the chip. Data 322 from chip 302 is latched into output latch 324 and driven and buffered by driver 326. The data is latched on a preselected edge of local clock 314. The data is received via multiplexer (MUX) 328. MUX 328 also receives a predetermined synchronization pattern in conjunction with the initialization alignment procedure. These will be further described below.

Data 322 is buffered by receiver (RX) 330 and provided to an elastic interface unit 332. Bus clock 306 sent along with data 322 is buffered by RX 334, the output of which forms I/O clock 336, also provided to elastic interface 332. Data from chip 304 being sent to chip 302, along with bus clock 308, is similarly received by interface 300 in chip 302, and it would be understood that the description of elastic device 332 to follow applies equally well in the receipt of data by chip 302 from chip 304.

Target cycle unit 339 sets the target cycle on which data is latched by the local clock in the receiving chip, such as local clock 316 in chip 304. The target cycle discussed in detail in conjunction with FIGS. 4A/B, illustrating an interface 322 having an elasticity of two. For an interface having an elasticity, E, target cycle unit may include a divide-by-E circuit. Additionally, target cycle unit 339 may include a programming register for holding the predetermined target cycle value, which may be loaded via target program 341. The target cycle programmed in target cycle unit 339 in chip 302 may be different than the target cycle programmed in target cycle unit 339 in chip 304. Target cycle unit 339 outputs select control 343, which may include a plurality of signals, depending on the embodiment of interface unit 332 and the corresponding elasticity, E. Select control 343 will be further described in conjunction with FIGS. 4A–8B in which embodiments of interface unit 332 are illustrated.

Figure 4A:
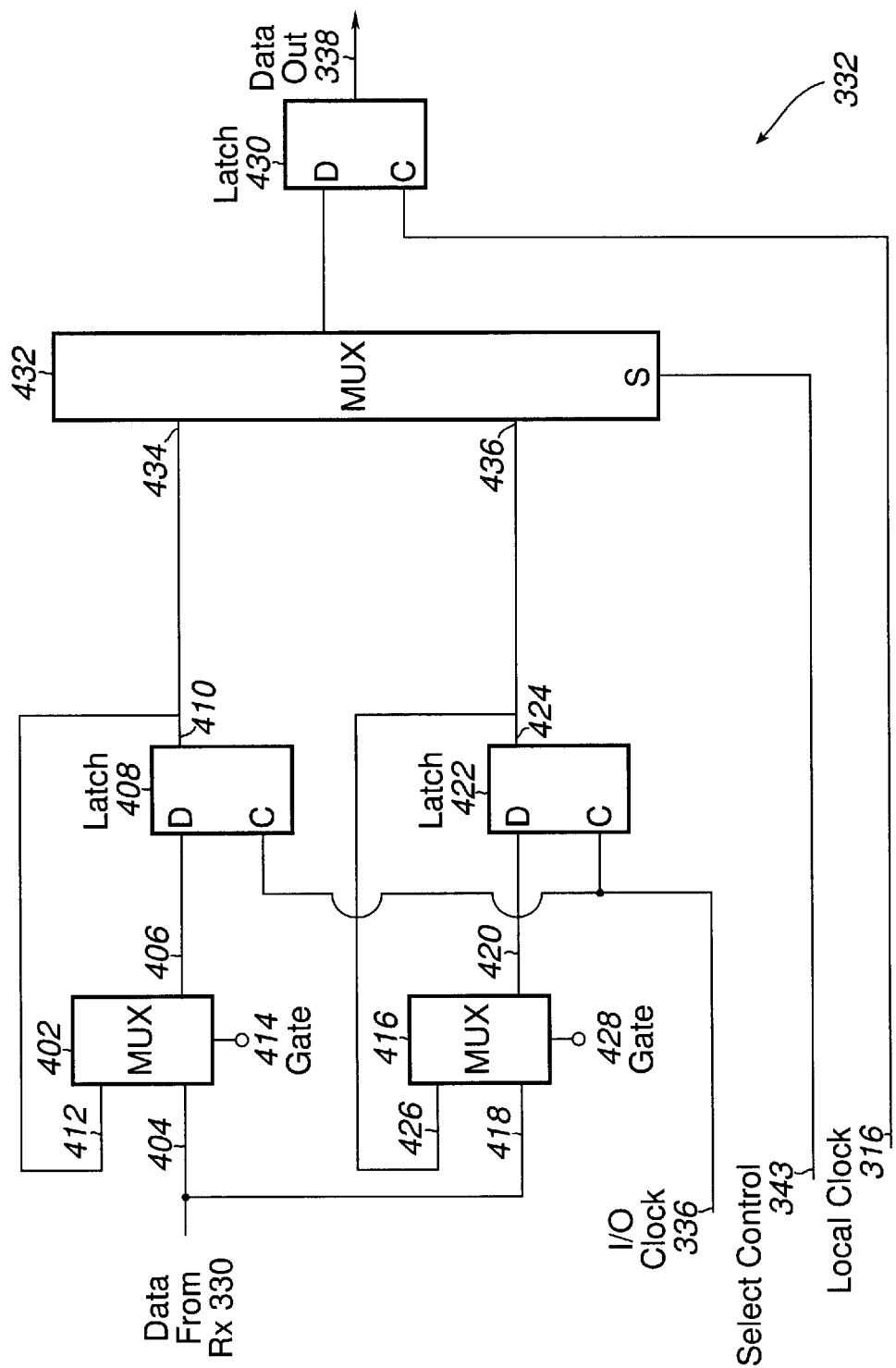
FIG. 4A illustrates, in block diagram form, an elastic interface in accordance with an embodiment of the present invention.

Refer now to FIG. 4A illustrating an embodiment of an elastic interface unit 332 in accordance with the present invention. Unit 332 includes MUX 402 having an input 404 which receives data from RX 330. Output 406 of MUX 402 is coupled to the data (D) input of latch 408. Latch 408 is clocked by I/O clock 336. Latch 408 latches data at the D input thereof on a rising edge of clock 336 and holds the data until a next rising edge of clock 336. Output 410 of latch 408 is coupled back to a second input, input 412 of MUX 402. MUX 402 selects between input 404 and input 412 for outputting on output 406 in response to gate 414.

Gate 414 is derived from bus clock 306 and has twice the period of bus clock 306. Gate 414 may be generated using a delay lock loop (DLL). An embodiment of a DLL which may be used in the present invention is disclosed in commonly owned, co-pending application entitled "Dynamic Wave Pipelined Interface Apparatus and Method Therefor," incorporated herein by reference. The phase of gate 414 is set during the initialization alignment procedure discussed below, and the operation of gate 414 will be further described in conjunction with FIG. 4B.

The data from RX 330 is also fed in parallel to a second MUX, MUX 416, on input 418. Output 420 of MUX 416 is coupled to a D input of a second latch, latch 422, which is also clocked by I/O clock 336, and latches data on a rising edge of I/O clock 336 and holds the data until a subsequent rising edge of the clock. Output 424 of latch 422 is coupled to a second input, input 426 of MUX 416.

MUX 416 selects between input 418 and input 426 in response to the complement of gate 414, \gate 428. Thus, when one of MUXs 402 and 416 is selecting for the data received from RX 330, the other is selecting for the data held in its corresponding latch, one of latches 408 and 422. In this way, a data bit previously stored in one of latches 408 and 422 is held for an additional cycle of I/O clock 336.

Hence, two data streams are created, each of which is valid for two periods of I/O clock 336. Because of the phase reversal between gate 414 and \gate 428, the two data streams are offset from each other by a temporal width of one data value, that is, one cycle of I/O clock 336.

Figure 1D:
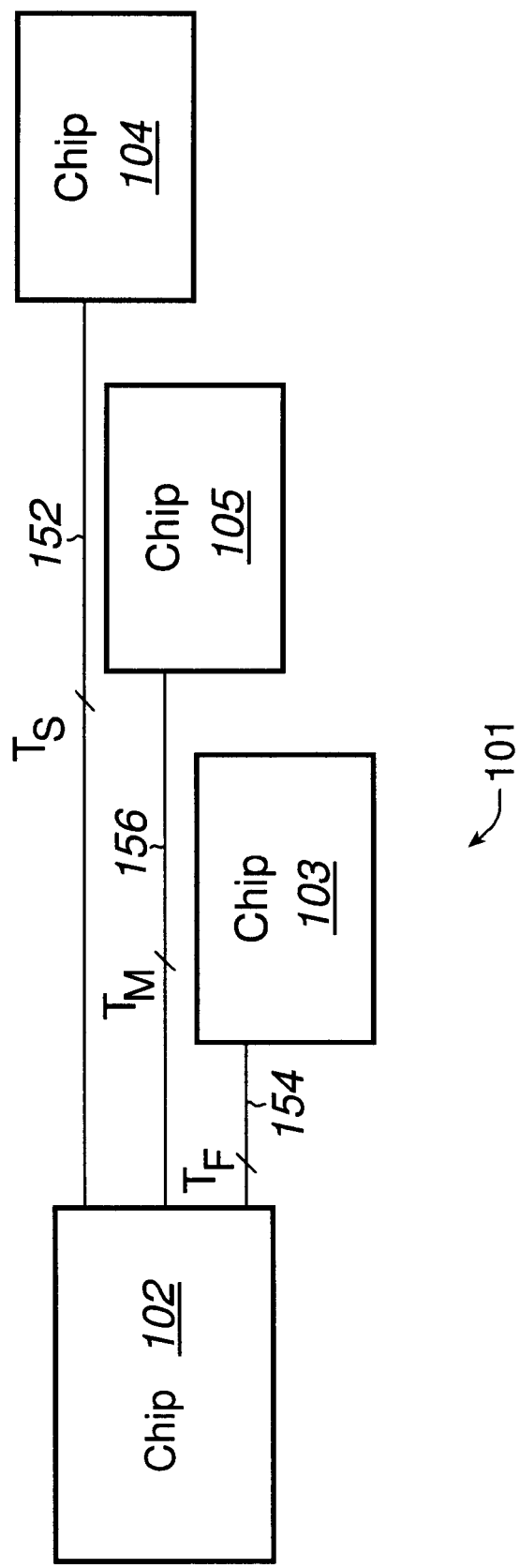
FIG. 1D illustrates a plurality of interconnected chips in a data processing system.
Figure 1E:
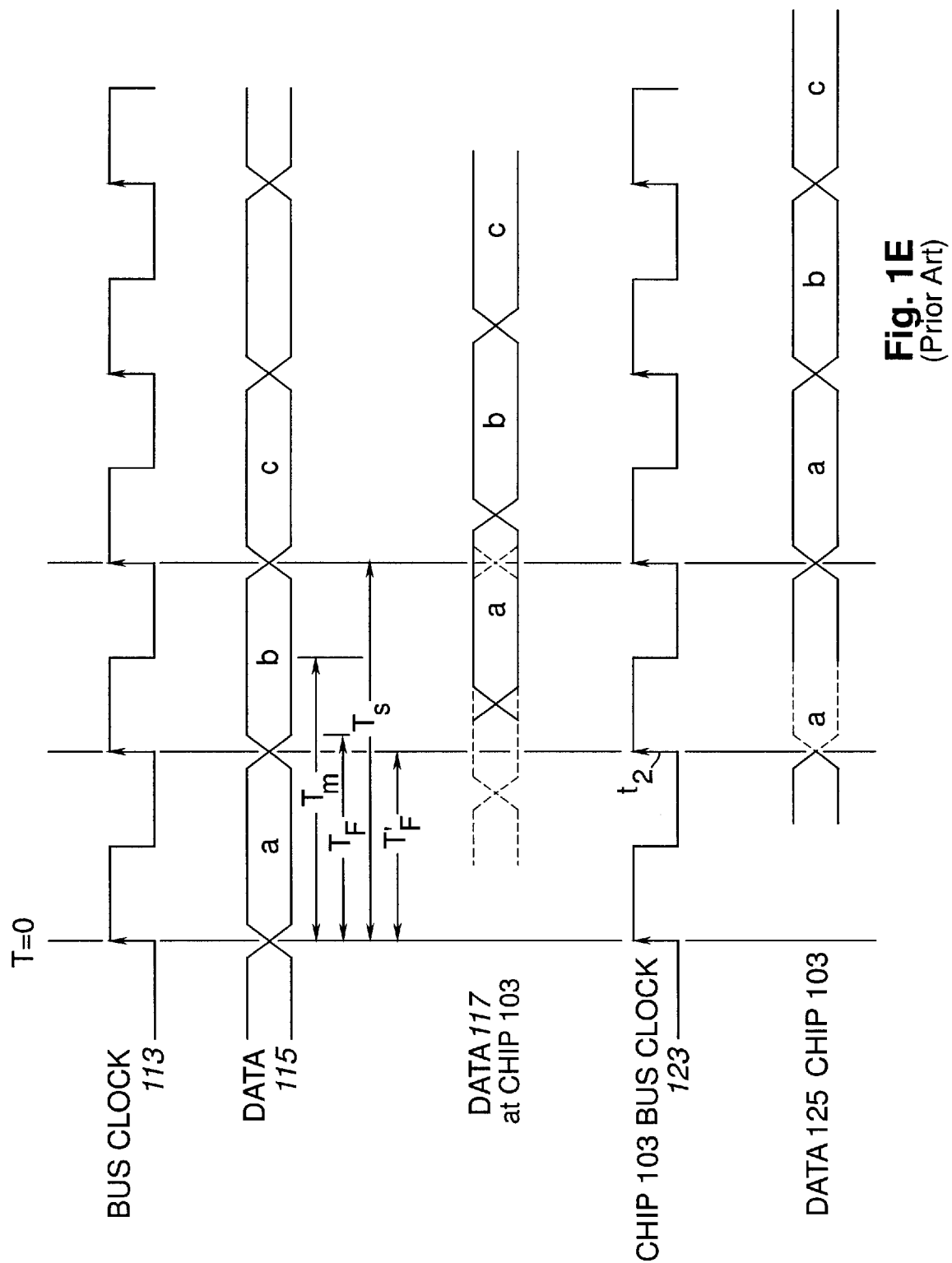
FIG. 1E schematically illustrates a timing diagram for an embodiment of the plurality of interconnected chips of FIG. 1D.
Figure 4B:
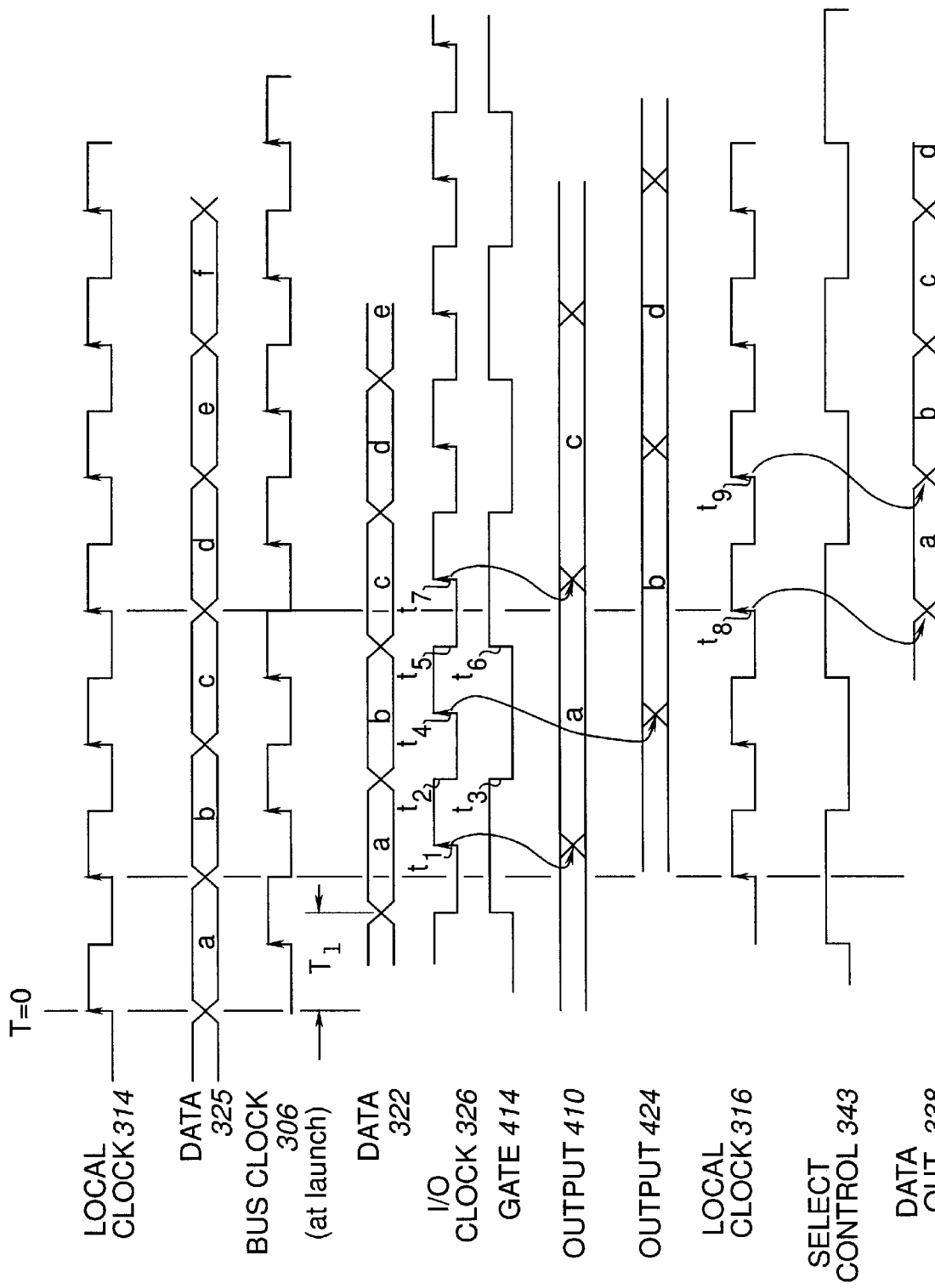
FIG. 4B schematically illustrates a timing diagram of the embodiment of the present invention of FIG. 3A.

This may be further understood by referring to FIG. 4B illustrating a timing diagram in accordance with elastic interface unit 332 in FIG. 4A. As previously described, data 325 held in output latch 324 is launched in synchrony with local clock 314 in chip 202. The data, data 322, is received at RX 230 in chip 204, is delayed by the latency represented by the path between chips 202 and 204, as discussed hereinabove in conjunction with FIG. 1D. On rising edge $t_1$ of I/O clock 336, data value "a" of data 322 is captured by latch 408 via output 406 of MUX 402. Because gate 414 is asserted, or "open", the data from RX 330 at input 404 is thereby selected for outputting by MUX 402. (A gate will be termed open when the corresponding MUX selects for the input receiving the incoming data stream. Although this is associated with a "high" logic state in the embodiment of FIG. 4, it would be understood that an alternative embodiment in which an open gate corresponded to a "low" logic level would be within the spirit and scope of the present invention.) Conversely, \gate 428 is negated. In response, MUX 416 selects a previous data value held in latch 422, which is coupled back to the D input of latch 422 through MUX 416. Thus, the data value held in latch 422 is retained for one additional period of I/O clock 336 which provides the clock signal for both latch 408 and 322, as described in conjunction with FIG. 4A.

I/O clock 336 is obtained from bus clock 306, as shown in FIG. 3. It is assumed that, at launch, bus clock 306 is centered in a data valid window, as illustrated in FIG. 4B. Bus clock centering is described in the commonly-owned, co-pending application entitled "Dynamic Wave-Pipelined Interface and Method Therefor," incorporated herein by reference. Bus clock 306 suffers a delay across the interface just as the data does. The latency is bus clock 306 at chip 304 may be comparable to $T_1$ and this is reflected in I/O clock 336 which is thereby centered relative to data 322.

Gate 414 is generated such that the edges of gate 414 are phase coherent with the falling edges of I/O clock 336. At edge 12 of I/O clock 336, gate 414 falls, edge $t_3$. In response, MUX 402 selects for the output 410 of latch 408, coupled to input 412 of MUX 402, for outputting at output 406. As gate 414 is negated, \gate 428 is asserted, whereby MUX 416 selects for outputting on output 420 the data from RX 330 on input 418. This is coupled to the D input of latch 422. The data received from RX 330 now corresponds to data value "b" of data 322.

At edge $t_4$ of I/O clock 336, latches 408 and 422 latch the data at their respective D inputs. In latch 408, this corresponds to the previously held data value, value a of data 322, which is then held for an additional period of local clock 416. Latch 422 latches data value b on its D input via MUX 416 onto output 424.

At the next transition of I/O clock 336, $t_7$, data value "c" is captured. Because, at edge $t_7$ gate 414 is asserted, data value c at data 322 appears on output 406 of MUX 402. Data value b is retained in latch 422 because \gate 428 is negated, being the complement of gate 414. As a stream of data continues to arrive on data 322, elastic device 332 continues, in this way, to generate two data streams at outputs 410 and 424 of latches 408 and 422, respectively. The two data streams contain alternating portions of the input data stream arriving on data 422 which are valid for two periods of local clock 416, as illustrated in FIG. 4B.

The structure of the input data stream is restored by alternately selecting values from one of the two data streams in synchrony with local clock 416. A local clock target cycle is selected. The local clock target cycle is the cycle at which data is to be captured into a destination latch by the local clock, such as local clock 316 in FIGS. 3 and 4. The target cycle is determined by analysis. The target cycle must be later in time than the worst case latency across the interface. For example, in the embodiment depicted in FIG. 4B, the target cycle has been set to be three periods of local clock 316, corresponding to edge $t_8$. The target cycle is measured from the zero time reference determined by reference clock 310, as previously described in conjunction with reference clock 106 in FIG. 1A. In the elasticity-two embodiment of FIG. 4A/B, the data arrival may be as much as two local clock cycles earlier than the target cycle. In such an embodiment, target cycle unit 339 in FIG. 3 includes a divide-by-two circuit.

With the target cycle set, data is selected for capture into destination latch 430, in response to local clock 316, via MUX 432. MUX 432 has a pair of inputs, 434 and 436. Input 434 is coupled to output 410 of latch 408, and input 436 is coupled to output 424 of latch 422. MUX 422 selects for outputting one of the two data streams represented by the output of latches 408 and 422 in response to select control 343. When select control 343 has a first logic state, "high" in the embodiment of FIG. 4B, MUX 432 provides the data at input 434 to the D input of latch 430, and when select control 343 has a second predetermined logic state, "low" in the embodiment of FIG. 4B, data at input 436 of MUX 432 is provided to the D input of latch 430. Select control 343 has a period that is twice the period of local clock 316, and is phase synchronous with local clock 316 such that select control 343 has the first logic state, and centered on, the target cycle. Thus, in FIG. 4B, at edge $t_8$ of local clock 316, data value a at output 410 is coupled, via MUX 432, to the D input of latch 430, and is latched by edge $t_8$ of local clock 316. At the next positive edge of local clock 316, $t_9$, the next portion of the transmitted data stream is latched into destination latch 430. Select control 343 has advanced in phase by one-half period and, therefore, has the second logic state, whereby output 424 of latch 422 is coupled to the D input of latch 432 via MUX 432. At edge $t_9$, data value b, at output 424 of latch 422 is latched into latch 432, and data value b appears on data out 338. In subsequent cycles of local clock 316, elastic interface 332 restores data stream 225 by alternately selecting between output 410 of latch 408 and output 424 of latch 422.

Before data can be transmitted across elastic interface 322, gate 414 (and concomitantly the complement, \gate 428) must be initialized. Because the latency across the interface can vary by more than one local clock period, gate 414 must be initialized with the proper phase. As previously described, the period of gate 414 is twice that of I/O clock 336, and local clock 316. Gate 414 is phase synchronous with I/O clock 316 such that flattop portions of gate 414 are centered on preselected edges of I/O clock 336, the positive edges in the embodiment of FIG. 4B.

Gate 414 may be initialized, in an embodiment of the present invention, by transmitting a synchronization (sync)

pattern on power up or reset. Referring again to FIG. 3, in response to a reset or power up of the data processing system, initialization alignment procedure (IAP) mode signal 340 is asserted, whereby MUX 328 selects for outputting a predetermined sync pattern. IAP mode signal 340 may be asserted, in an embodiment of the present invention, by CPU 210 in response to BIOS instructions included in ROM 216.

In the embodiment of elastic interface unit 332 illustrated in FIG. 4A, data can arrive in a two-cycle window without creating synchronization problems, as previously described. Elastic interface unit 332 in FIG. 4A is referred to as having an elasticity of two. In the IAP, the synchronization pattern is required to be periodic with a period, P, equal to or greater than the elasticity of the elastic device. Thus, for the elastic interface unit 332 of FIG. 4B, a suitable synchronization pattern would be a plurality of bits alternating between "1" and "0" with an initial bit of "1". Embodiments of elastic interfaces having elasticities other than two will be described below, and the synchronization pattern will be modified accordingly. For example, for an elastic interface having an elasticity N (discussed in conjunction with FIG. 8A/B below), a suitable pattern would be an initial bit of "1" followed by N–1 bits of "0", which pattern then repeats. Other bit patterns may also be used. For example, bit patterns complementary to the exemplary patterns hereinabove may alternatively be used.

In setting the phase of gate 414, output 410 of latch 408 may be sampled while the sync pattern is being sent. Gate 414 is initialized with a preselected phase. If, for the sync pattern described hereinabove for elastic interface unit 332 having elasticity two, a "1" is detected at output 410, then gate 414, and concomitantly \gate 428, are properly phased. Otherwise, the phase of gate 414, and correspondingly \gate 428, should be shifted by one-half of the period of I/O clock 336. As previously discussed, gate 414 may be generated using a DLL, an embodiment of a DLL is disclosed in the co-pending commonly assigned, above-referenced, application entitled, "Dynamic Wave Pipelined Interface Apparatus and Method Therefor," incorporated herein by reference.

Figure 5:
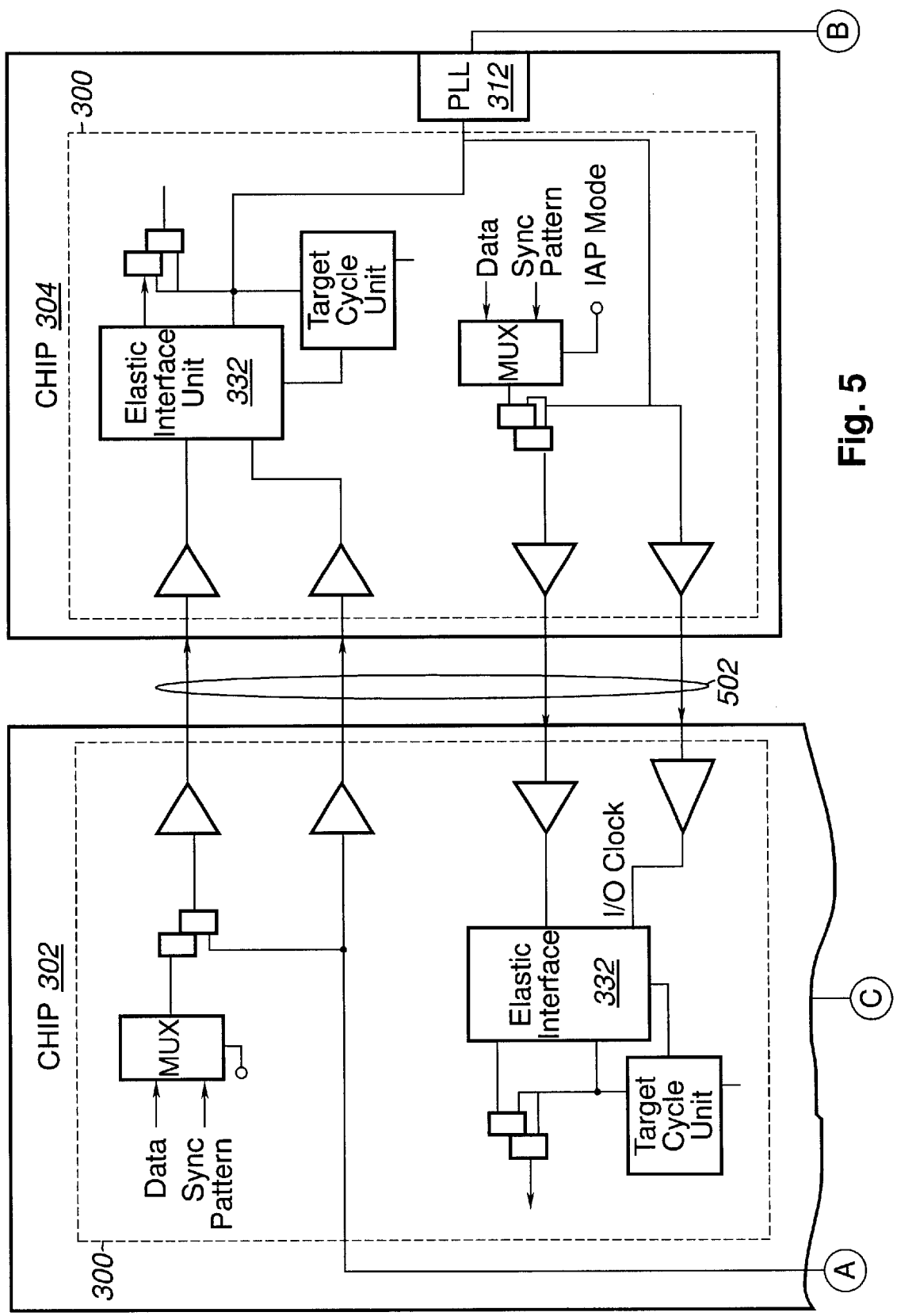
FIG. 5 illustrates an alternative embodiment of a chip interface in accordance with the present invention.
Figure 5:
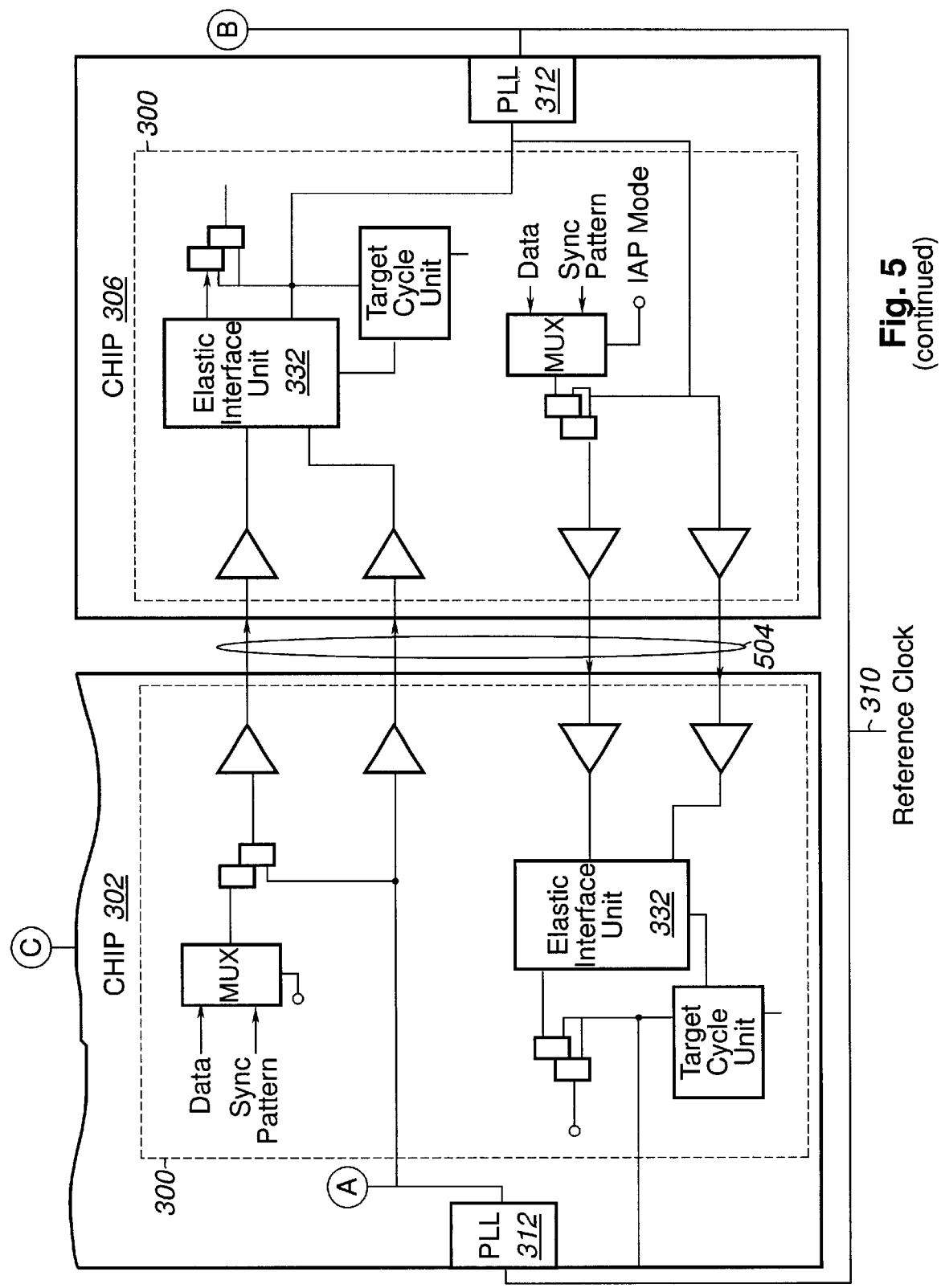

The operation of an elastic interface in accordance with the principles of the present invention, such as elastic interface 300, may be further understood by referring now to FIG. 5. In FIG. 5, chip 302 exchanges data with chip 304, as in FIG. 3, and additionally with chip 306. Chip 302 includes two of interfaces 300, one of which couples chip 302 to chip 304 via an interface 300 included in chip 304, and the second of which couples chip 302 to chip 306 which also includes an interface 300 in accordance with an embodiment of the present invention. Path 502, coupling chips 302 and 304 may be a fast path, similar to path 154 in FIG. 1D having a latency $T_F$, and path 504 coupling chip 302 to chip 306 may be a slow path, such as path 152 in FIG. 1D with a latency $T_S$. In an interface in accordance with the prior art, if the latency difference between paths 502 and 504 exceeds a period of the bus clock, path 502 would require padding in order to maintain synchronization of the data, as previously described. However, interfaces 300 incorporating elastic interface unit 332 accommodates the difference in the latencies between path 502 and 504. By setting the target cycle in each of elastic interfaces 332 in chips 304 and 306 to be the same cycle, as described hereinabove, data synchrony among chips 302, 304, and 306 is maintained.

Figure 6A:
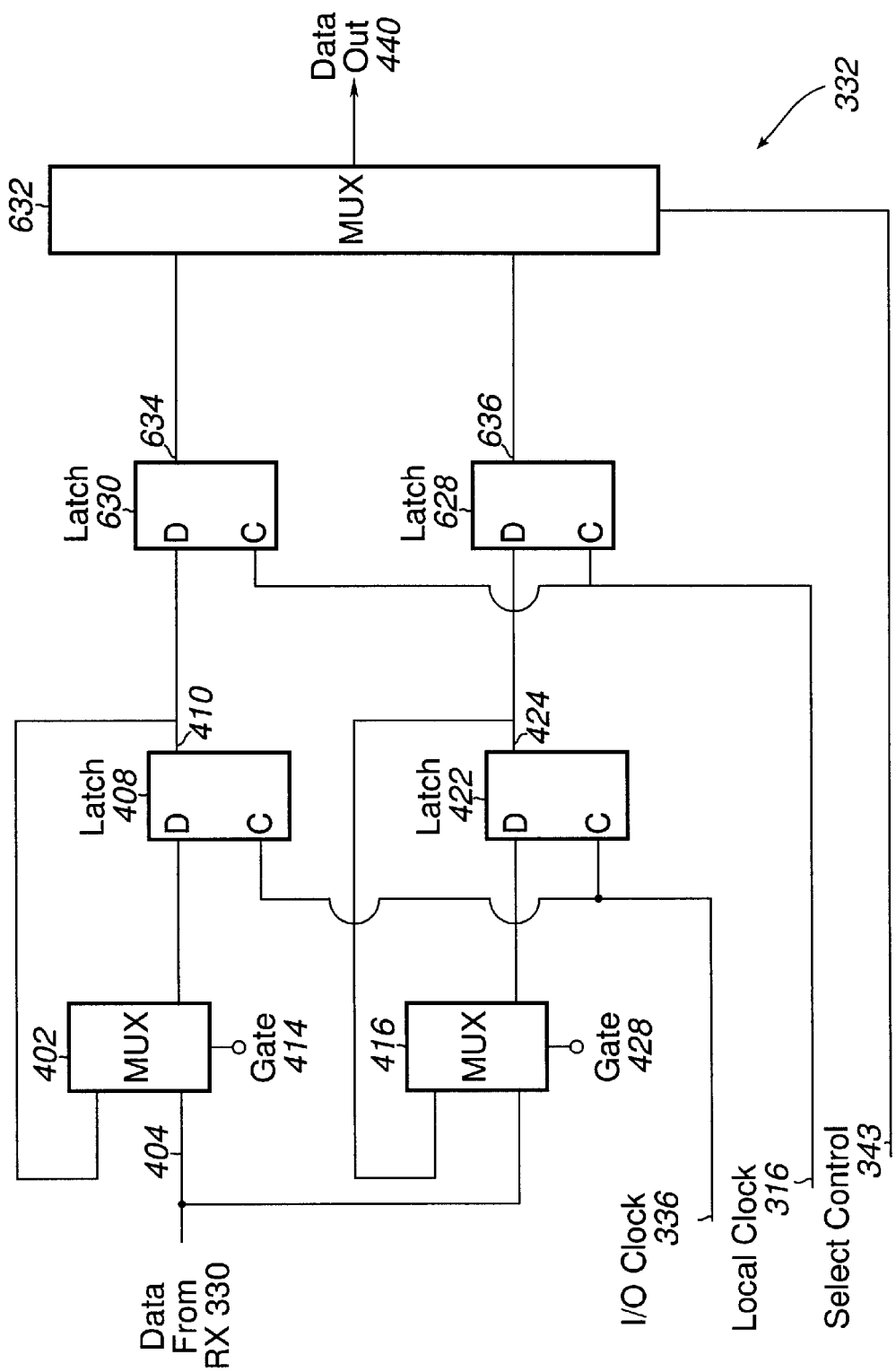
FIG. 6A illustrates another alternative embodiment of an elastic interface according to the present invention.

Alternative embodiments of the present invention may be implemented. An alternative embodiment of interface unit 332 having an elasticity of two is illustrated in FIG. 6A. The embodiment of elastic interface 232 shown in FIG. 6A includes MUXs 402 and 416 driving latches 408 and 422 as in the embodiment of elastic interface 232 illustrated in FIG. 4A. However, interface unit 332 of FIG. 6A includes a second capture latch, latch 628, clocked by local clock 316, in addition to latch 630 which corresponds to latch 430 in the embodiment shown in FIG. 4A. Additionally, the output MUX 632, corresponding to MUX 432 in FIG. 4A has been moved downstream of the capture latches, in the embodiment of interface unit 332 in FIG. 6A.

This reduces the latency through the interface itself. The D inputs of latches 628 and 630 are coupled to outputs 424 and 410 of latches 422 and 408, respectively. The data at the D inputs of latches 628 and 630 are clocked into the latches by local clock 316. Thus, data is captured in the local clock 316 ahead of MUX 632. Data stream 322 is restored by selecting for outputting one of the outputs 634 and 636 of latches 628 and 630 via MUX 632, under the control of select control 343. This is similar to the action of output MUX 432 in the embodiment of FIG. 4A, however, select control 343 is shifted in phase by one-half period as compared to select control 343 in FIG. 4A. In the embodiment of interface 322 in FIG. 6A, the data is latched on a rising edge of local clock 316. It would be understood, however, by an artisan of ordinary skill that alternative embodiments may latch the data on a falling edge provided that other control signals are appropriately adjusted in phase. For example, in an embodiment in which latches 628 and 630 latch on the falling edge of local clock 316, select control 343 would have its phase shifted by one-half period.

The operation of the embodiment of interface unit 332 of FIG. 6A may be further understood by referring now to FIG. 6B illustrating a timing diagram therefor. Because MUXs 402 and 416, and latches 408 and 422, as well as I/O clock 336 and local clock 316 are common to the embodiments of interface unit 332 in FIGS. 4A and 4B, the portion of the timing diagram illustrated in FIG. 6B related to those structures will not be discussed again, in the interest of brevity.

Focusing on the portion of the timing diagram of FIG. 6B associated with latches 628 and 630, and MUX 632, data value a is latched onto output 634 of latch 630 on edge $t'_8$ of local clock 316. Similarly, data value b is latched onto output 636 of latch 628 on edge $t'_9$ of local clock 316. In order that data appear on data output 338 at the target cycle, the rising edge of select control 343 must be delayed until edge $t'_9$ of local clock 316, which coincides with the target cycle. Thus, data value a appears on data out 338 from MUX 632 at edge $t_{10}$ of select control 343. Hence, select control 343 is phase synchronous with local clock 316, having flattops centered between rising transitions of local clock 316. Similarly, data value b appears on data out 338 on falling edge $t_{11}$ of select control 343, and data stream 322 continues to be restored thereafter on subsequent transitions of select control 343.

Figure 7A:
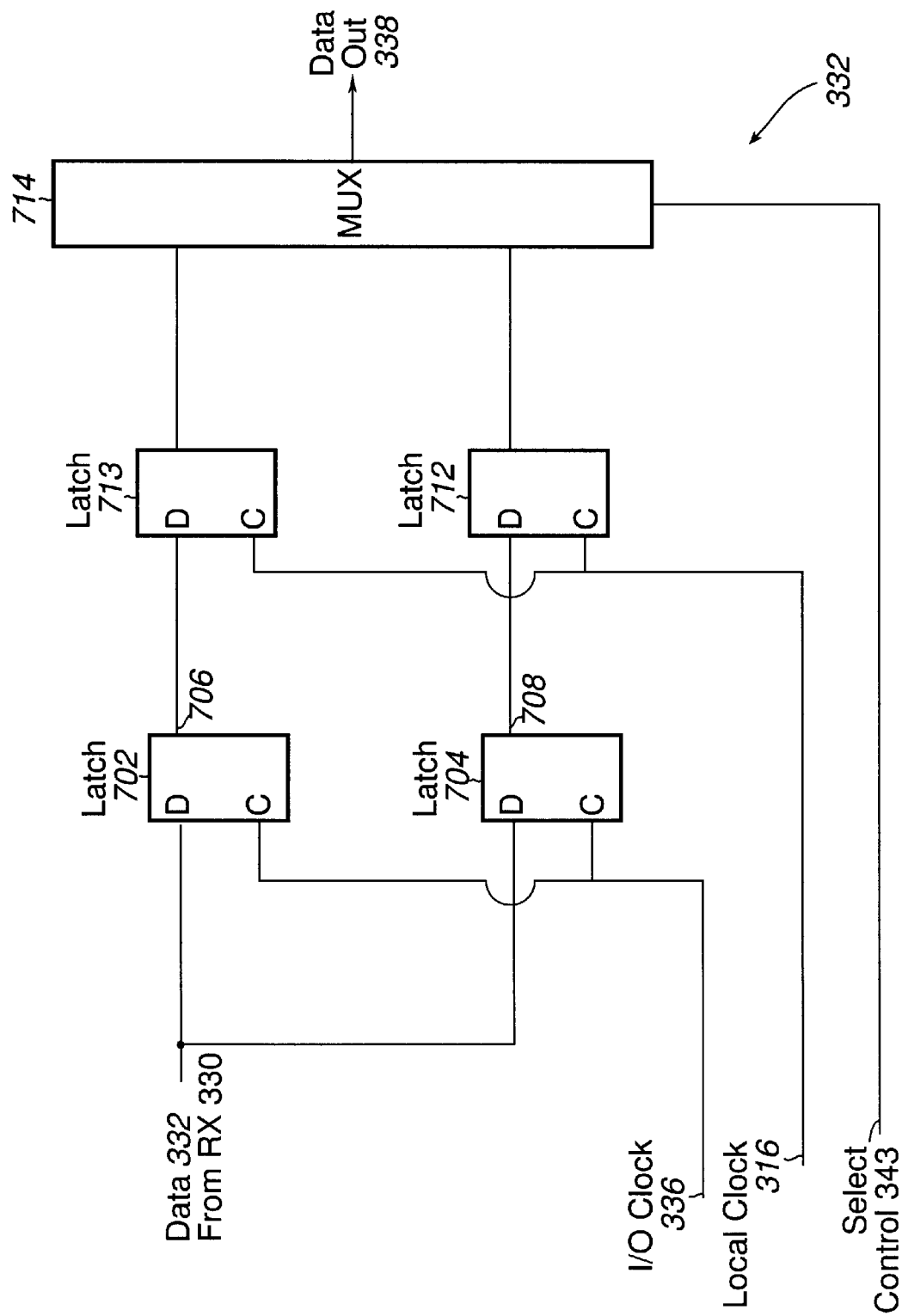
FIG. 7A illustrates another alternative embodiment of an elastic embodiment according to the present invention.

Additionally, embodiments of elastic interface 232 having other predetermined elasticities may be implemented in accordance with the present invention. These may include half-period elasticities. An embodiment of the present invention having an elasticity of 1.5 periods is illustrated in FIG. 7A. Data 322 is coupled to the D inputs of latches 702 and 704. Latches 702 and 704 are "polarity hold", or "flush" latches. Such latches may also be referred to as "transparent" latches. When the clock (C) in latch 702 has a first predetermined logic state, or level, data on the D input flushes through to output 706. On the transition of the clock from the first state to a predetermined second logic state, latch 702 latches the data on the D input and the data on output 706 is held until the subsequent transition of the clock from the second state to the first state. (In the embodiment of FIG. 7, the first state corresponds to a "low" logic level and the second state corresponds to a "high" logic level, whereby the transition constitutes a rising edge. However, an alternative embodiment having the complementary logic states would be within the spirit and scope of the present invention.) Latch 704 flushes data on its D input through to output 708 when its clock, C, has the second logic level. The data is latched on the transition from the second logic level to the first logic level of the clock, and held until the clock transitions from the second logic level to the first logic level, which in the embodiment of FIG. 7, is "low." The flush through property allows data to become available without having to wait until a latch is clocked, thereby. implementing a "low-latency-low-elasticity" embodiment of interface unit 332.

In the embodiment of elastic interface 322 illustrated in FIG. 7A, latches 702 and 704 are clocked by I/O clock 726. Elastic interface 322 of FIG. 7A is a double data rate (DDR) device in that data is latched into one of latches 702 and 704 on each transition of I/O clock 726, and the period of I/O clock 726 is twice that of the local clocks, local clock 314 and local clock 316, and bus clock 306. Bus clock 306 is centered in a data window that is two local clock periods in width.

Figure 7B:
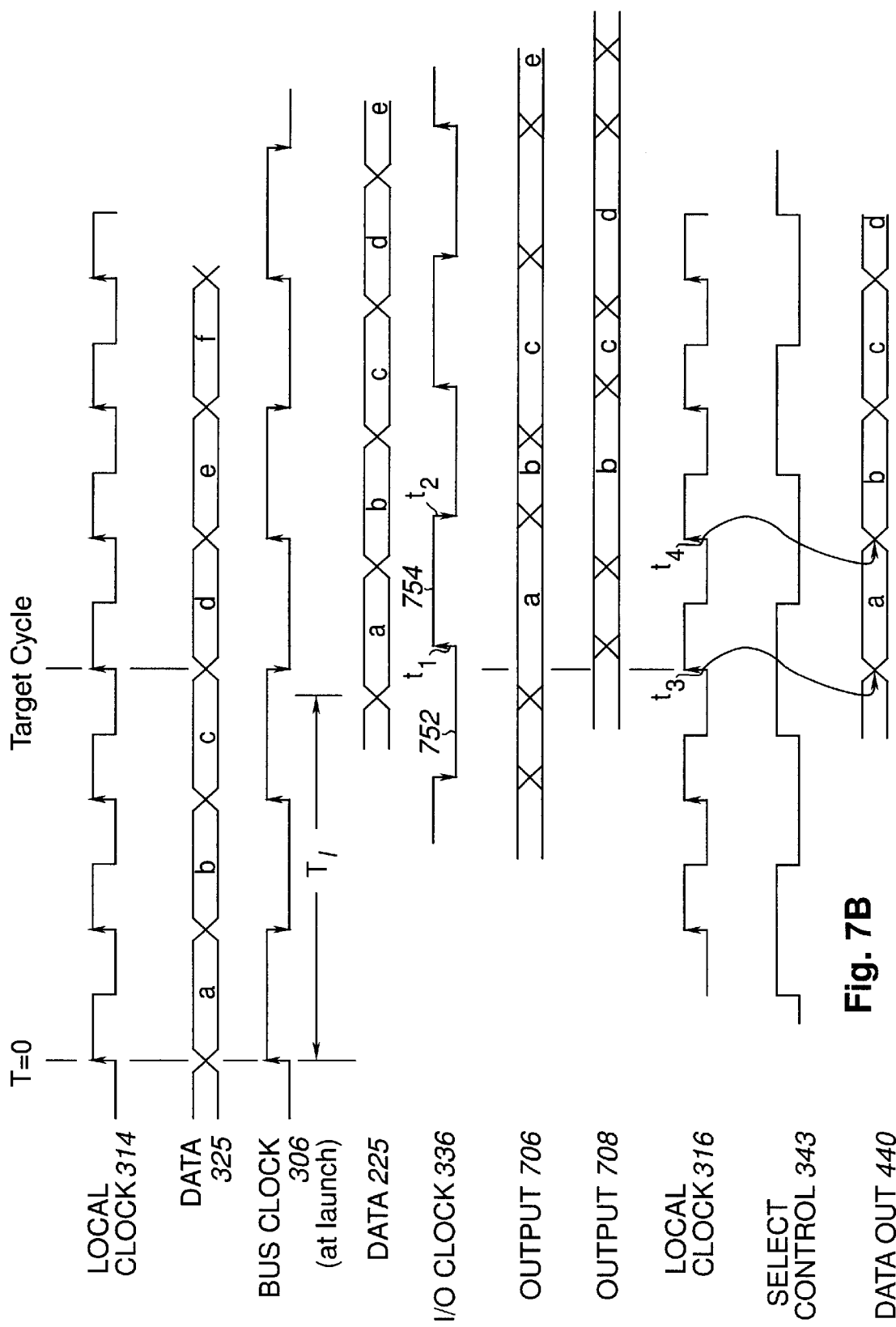
FIG. 7B schematically illustrates a timing diagram for the embodiment of FIG. 7A.

The embodiment of elastic interface unit 332 is FIG. 7A may be further understood by referring to the corresponding timing diagram shown in FIG. 7B. When data value a arrives at elastic interface unit 332, it flushes through to output 706 of latch 702 because I/O clock 716 is low, at "flattop" 752. In other words, data value a appears on output 706 of latch 702 prior to edge $t_1$ of I/O clock 716.

Data portion a precedes transition $t_1$ by one-quarter period of I/O clock 336 which corresponds to one-half period of local clock 316. I/O clock 336 is derived from the bus clock and is shifted in phase relative to the bus clock at launch by the latency of the path between the chips, as previously described. Additionally, I/O clock 716 is given a one-quarter period phase advance. At edge $t_1$, data value a is latched whereby it is held for one period of local clock 316.

Similarly, data value b flushes through to output 708 of latch 704 when it arrives at elastic interface unit 332 from RX 230 because I/O clock 716 is high, at flattop 754. Data value b is then held on output 708 by negative edge $t_2$ of I/O clock 716. Data value b is held for one period of local clock 316. Thus, data values appear on outputs 706 and 708 of latches 702 and 704, respectively, for 1.5 local clock periods, which is the elasticity of the embodiment of elastic interface 332 of FIG. 7A.

Data stream 332 is reconstructed at output 338 by latches 710 and 712, and MUX 714. The two data streams represented by outputs 706 and 708 are, respectively, latched into latches 710 and 712 by local clock 316. Data is latched on a predetermined edge (positive in the embodiment of FIG. 7) of local clock 316 wherein the target cycle may be set to occur anywhere within the one and one-half cycles of elasticity of data value a, previously described. Thus, data value a, in accordance with the timing diagram in FIG. 7B, is latched into latch 710 on edge $t_3$ of local clock 316 and switched onto data 338 via MUX 714 in response to select control 343. Data is selected from latch 710 in response to select control 343 having a first predetermined value and selected from latch 712 when select control 343 has a second predetermined value. The first value is "high" and the second "low" in the embodiment of FIG. 7, however, it would be understood that other predetermined values are within the spirit and scope of the present invention. At edge $t_4$ of local clock 316, data value b is latched into latch 712, and switched onto data 338 in response to select control 343 have the second value. Subsequent data values are then sequentially output on output 338 by alternately selecting the output from latches 710 and 712 via MUX 714, as illustrated in FIG. 7B.

Figure 8A:
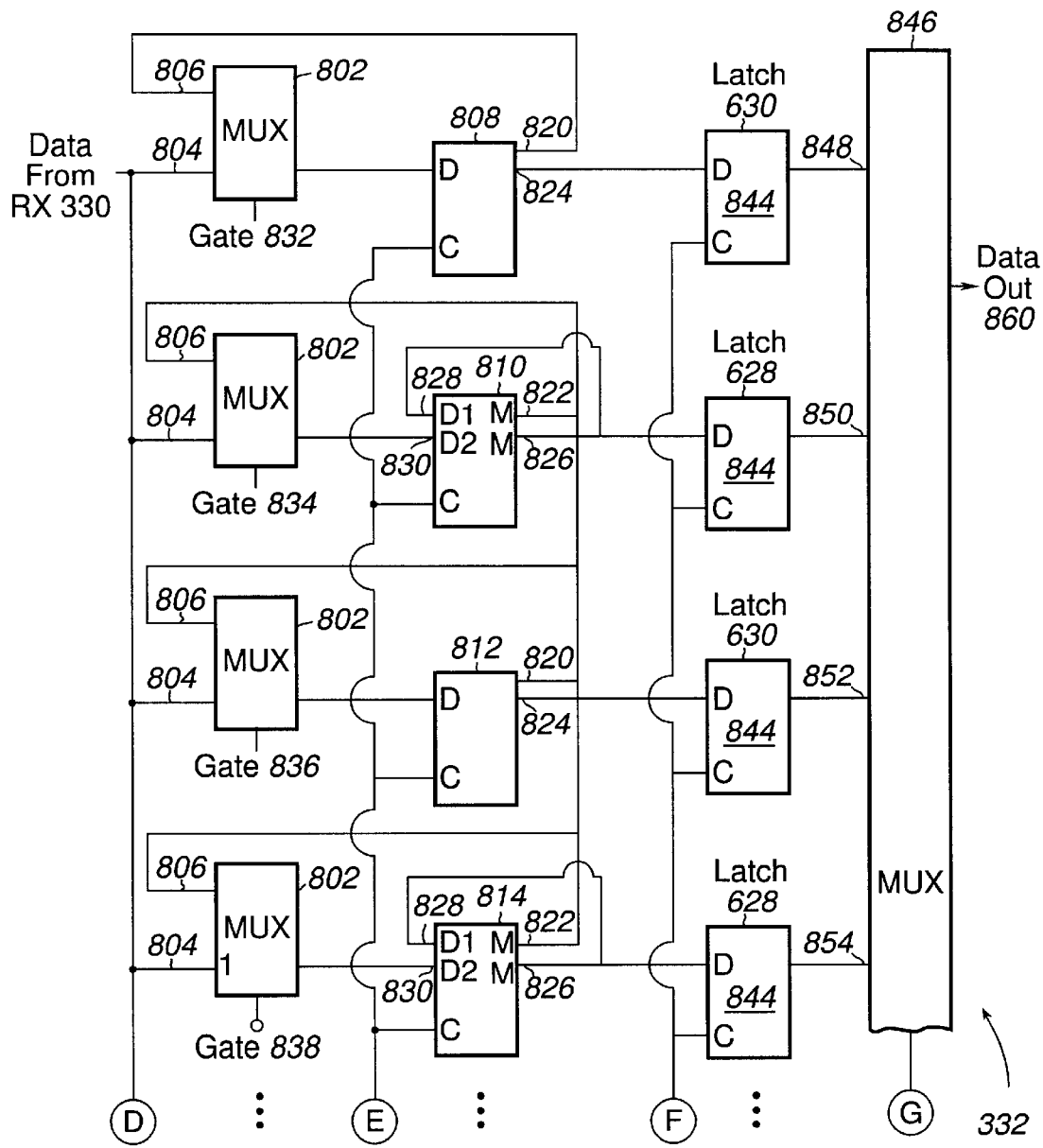
FIG. 8A illustrates in block diagram form yet another alternative embodiment of the elastic interface according to the present invention.

Additionally, elastic interfaces in accordance with the principles of the present invention are expandable, whereby elasticities may be increased by adding steering and storage elements. An embodiment of an elastic interface having an elasticity of N−1 bus clock periods is illustrated in FIG. 8A. Interface unit 332 includes a plurality, N of MUXs 802. A first input 704 in each MUX receives data stream 322 from RX 330. A second input 806 receives a signal output by a corresponding one of latches 808–818. Each of latches 808-818 includes a latch pair. In latches 808, 812 and 816, the latch pairs have an internal output of a first one of the pair coupled to an internal input of a second one of the pair, in master-slave fashion. Latches 808, 812 and 816 provide an output 820 from the slave portion to an input 806 of the corresponding MUX 802. The slave portion of latches 808, 812 and 816 latch the data on the D input on a rising edge of I/O clock 336. Latches 808, 812, and 816 have their respective D inputs coupled to the output of a corresponding MUX 802. Latches 810, 814 and 818 couple output 822 from the first one of the latch pair to input 806 of a corresponding MUX 802. The first one of the latch pair is transparent and data on a first input 828 flushes through to output 822 on a "flattop" of I/O clock 336. Input 828 in each of latches 810, 814 and 818 is coupled to a corresponding output 826 from the second one of the latch pair. Additionally, an input 830 to the second one of the pair is coupled to an output of the corresponding MUX 802. The second one of the latch pair is also transparent, and flushes data through on a flattop of I/O clock 336. The first and second one of the pairs forming latches 810, 814 and 818 flush data through on flattops of I/O clock 336 having opposite polarity.

MUXs 802 select between the signals on inputs 804 and 806 in response to a corresponding gate signal, gates 832–842. Gate signals 832–840 will be discussed further in conjunction a timing diagram illustrated in FIG. 8B.

Data is latched into the local clock via data latches 844, each of which receives an output signal from a corresponding one of latches 808–818. Data is latched into data latches 844 by local clock 316. Output 824 of latches 808, 812 and 816 is provided to the D input of a corresponding data latch 844. Outputs 824 are obtained from the master portion of latches 808, 812 and 816, which is transparent, as previously described. The remaining ones of data latches 844 receive on their D inputs the signal from output 826 from the second one of the latch pairs forming the corresponding one of latches 810, 814 and 818. This second one of the latch pairs is also a transparent latch with data flushing through on a polarity of I/O clock 336 opposite to that on which data flushes through in the first one of the latch pairs.

MUX 846 selects one of the signals held in data latches 844 for outputting. An output of each of data latches 844 is coupled to a corresponding input, one of inputs 848–858. The signal is output to the chip, such as chip 302 or 304 on output 860 of MUX 846. MUX 846 selects among input 848–858 via select control 343. Select control 343 includes k-signals, wherein $2_k$ is equal to N.

An alternative embodiment, having an elasticity of N may be implemented using the circuitry shown in FIG. 8A. By coupling the respective D inputs of data latches 844 to outputs 820 of the corresponding one of latches 808, 812 and 816, and to outputs 826 of the corresponding one of latches 810, 814 and 818 (instead of outputs 824 and 822 as shown in FIG. 8A), an elasticity of N is obtained. The circuitry of interface unit 332 in FIG. 8A is otherwise unchanged.

Figure 8A:
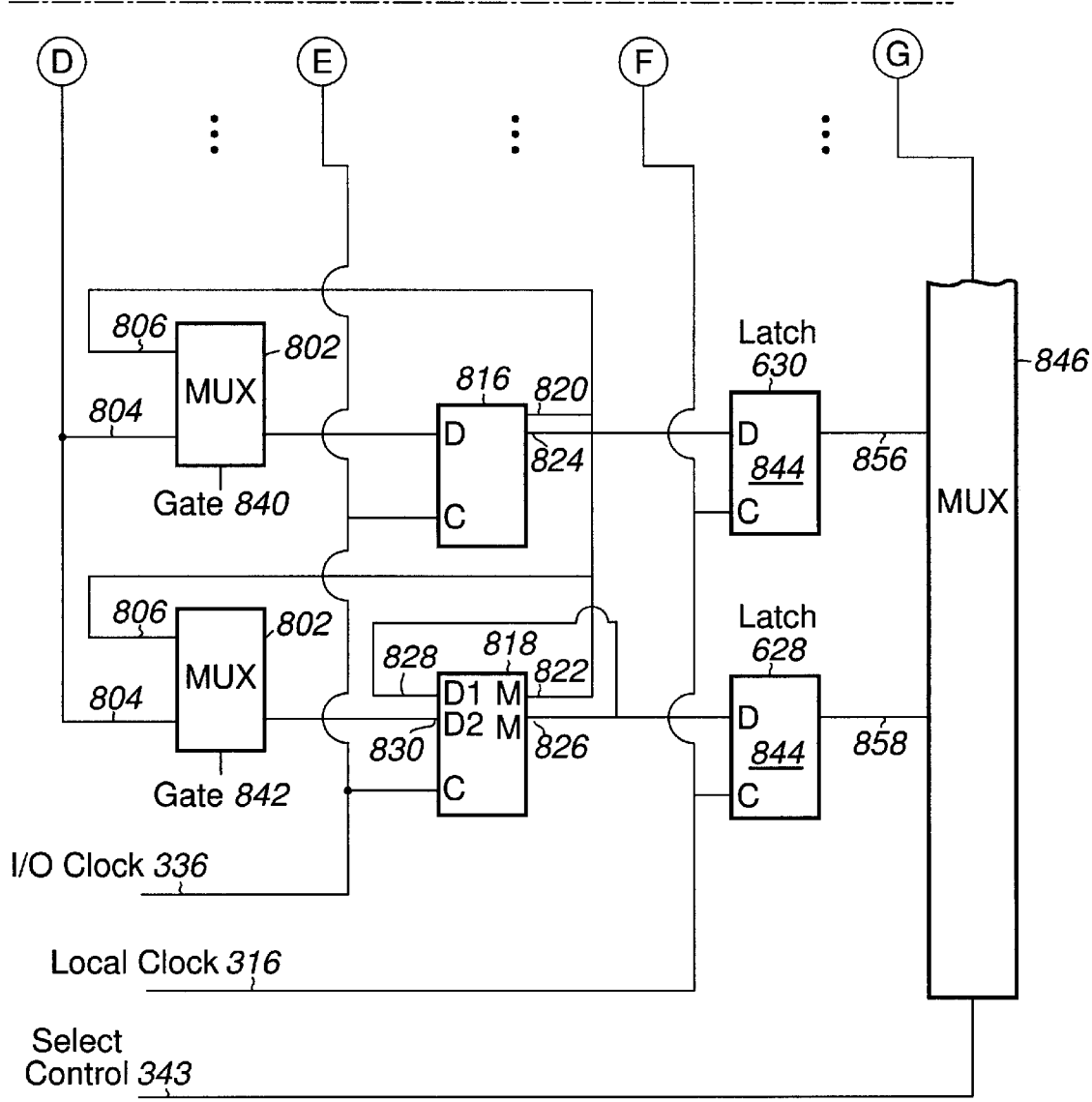
Figure 8B:
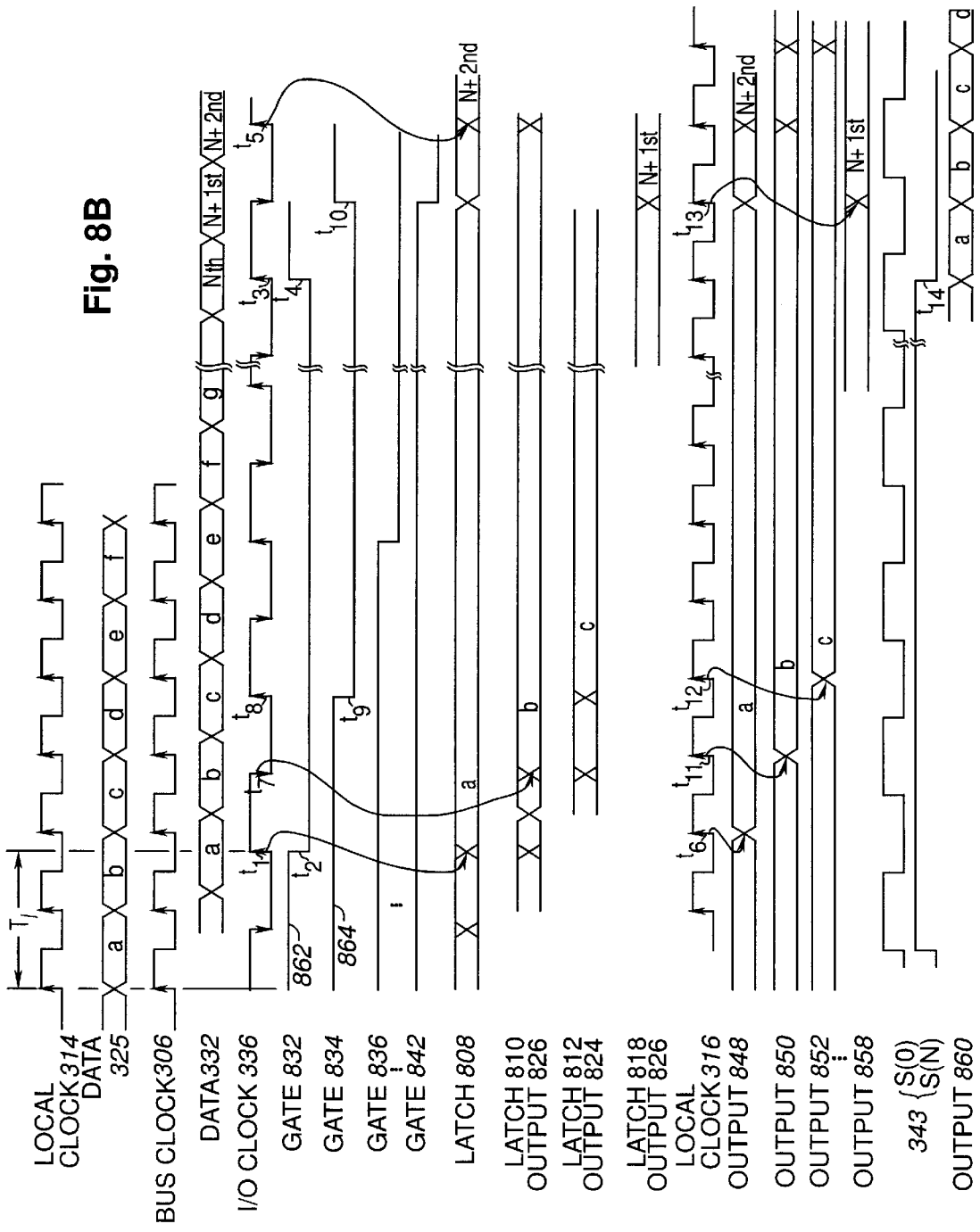
FIG. 8B schematically illustrates a timing diagram for the embodiment of FIG. 8A.

Refer now to FIG. 8B illustrating a timing diagram for interface unit 332 illustrated in FIG. 8A. Data value a arrives in the data stream on data 322 after the interface latency of $T_1$, and in response to the assertion of gate 832 provided to the corresponding one of MUXs 802, represented by "flattop" 862, data value a is passed through the corresponding MUX 802 to the D input of latch 808. On edge $t_1$ of I/O clock 336, latch 808 holds data value a which is coupled back on output 820 of latch 808 to input 806 of the corresponding one of MUXs 802. At edge $t_2$ of gate 832. the corresponding MUX 802 selects for the signal on input 806, which has the data value a. Gate 832 is negated for N−1 periods of bus clock 306, whereby the data value a is maintained on the D input of latch 808 and, therefore, on output 824 of latch 808. The data value a is held for an additional cycle of bus clock 306 by transition t3 of I/O clock 336, after which the transition $t_4$ of gate 832 switches the corresponding MUX 802 to select for the data stream on data 322, whereby at edge $t_5$ of I/O clock 336 the (N+2)nd data value in data 332 is latched into latch 808 on edge $t_5$ of I/O clock 336. Data value a is captured into the data latch 844 receiving output 824 of latch 808 on edge $t_6$ of local clock 316, and appears on output 848. Data value a is held on output 848 for N periods of bus clock 306.

A next data value in data 332, data value b is similarly held for N periods of bus clock 306 in the data latch 844 coupled to latch 810. When data value b arrives at unit 332, gate 834 is asserted, represented by "flattop" 864, and selects for data 332 on input 804 of the corresponding MUX 802. Data value b appears at input 830 of latch 810 and is latched by edge $t_7$ of I/O clock 336, whereby data value b appears on output 826 of latch 810. Output 826 of latch 810 is fed back to input 828 of latch 810. Because I/O clock 336 is negated following edge $t_7$, data value b on output 826 of latch 810 falls through to output 822 of latch 810, where it is coupled back to input 806 of the corresponding MUX 802. At edge $t_8$ of I/O clock 336, data value b is held on output 822 of latch 810. At edge 19 of gate 834, the corresponding MUX 802 switches and selects input 806 for outputting data value b held on output 822 of latch 810 into input 830 of latch 810. Data value b then falls through to output 826 of latch 810 where it is coupled back into input 828 of latch 810, and data value b continues to be fed back to input 806 of the corresponding MUX receiving gate signal 834. Thus, data value b is held on output 826 in latch 810 for N+1 periods of bus clock 306, one clock period after gate 834 transitions at edge $t_{10}$.

Gate 836 is delayed in phase relative to gate 834 by one period of I/O clock 336, and similarly each succeeding gate signal 838–842 are delayed in phase by one period of I/O clock 336 relative to the preceding gate signal in the chain. In this way, each succeeding latch 808–818 stores the succeeding data value in data 332, and holds the data value for N+1 periods of bus clock 306. Each data value in the respective latch 808–810 is then latched in the corresponding data latch 844 each period of local clock 316. Thus, data value b is latched into the corresponding data latch 844 on edge $t_{11}$ of local clock 316 and appears on output 850, and, likewise, data value c is clocked into its respective data latch 844 on edge $t_{12}$ of local clock 316 and appears on output 852. The last data latch 844, coupled to latch 818, latches the (N+1)st data value on edge $t_{13}$ of local clock 316.

Data is output from MUX 846 in response to select control 343 which includes k signals. Each of the k signals of select control 343 is periodic. A "zeroith" signal, denoted S(O), has a half-period that is equal to the period of bus clock 306. The (k−1)st signal has a half-period that is N bus clock periods. Each signal in sequence between S(O) and S(N) has a periodicity that is twice the period of the preceding signal. The data value stored in data latches 844, appearing on a corresponding input 848–858 in MUX 846 are sequentially clocked out onto data out 860 in response to select control 343. Data value a is clocked out at the target cycle, having an elasticity N−1, on edge $t_{14}$ of S(N) in select control 343. The remaining data values are sequentially clocked out in response to the cyclic transitions of the k signals in select control 343. Although the signals constituting select control 343 have been shown to have phase synchrony on a rising edge, it would be understood by an artisan of ordinary art that the complementary phase may be used in an alternative embodiment.

Unit 332 illustrated in FIG. 8 is initialized during an IAP as previously described hereinabove in conjunction with FIG. 4. A suitable initialization pattern may have a periodicity of N−1 for an embodiment with an elasticity of N−1, corresponding to the elasticity of the embodiment of unit 332 illustrated in FIG., 8. For an alternative embodiment having an elasticity of N, as described hereinabove, the sync pattern may have a periodicity N. During initialization, for a sync pattern having a "1" followed by a plurality of "0" s, the "1" would be sampled in latch 808 when signals in select 343 are properly sequenced.

In this way, a mechanism for maintaining data synchrony through interfaces in a data processing system has been provided. Received data is captured into a plurality of storage elements, and selectively steered into the receiving chip on a pre-selected target cycle that is synchronized with the chip clock. Initial synchronization is established dynamically by performing an IAP. The mechanism of the present invention provides data synchronization in a data processing system having latencies that vary by more than one bus clock cycle.

Although the present invention and its advantages have been described in detail, it should be understood that various changes, substitutions and alterations can be made herein without departing from the spirit and scope of the invention as defined by the appended claims.

What is claimed is:

1. An interface apparatus comprising:
   a first storage device operable for storing a first set of data values;
   a second storage device operable for storing a second set of data values; and
   circuitry coupled to said first and second storage devices operable for sequentially outputting a first data value from said first storage device and a second data value from said second storage device in response to at least one control signal, wherein said first and second storage devices hold data values for a predetermined number of half-periods of a first clock, wherein said at least one control signal is operable for outputting said first data value on a preselected cycle of said first clock, wherein said first storage device latches data on a first predetermined edge of a second clock, and said second storage device latches on a second predetermined edge of said second clock.

2. The apparatus of claim 1 wherein said second clock has a period equal to the period of said first clock.

3. The apparatus of claim 1 wherein said second clock is derived from a clock signal received from a sending device.

4. An interface apparatus comprising:
   a first storage device operable for storing a first set of data values;
   a second storage device operable for storing a second set of data values;
   circuitry coupled to said first and second storage devices operable for sequentially outputting a first data value from said first storage device and a second data value from said second storage device in response to at least one control signal, wherein said first and second storage devices hold data values for a predetermined number of half-periods of a first clock, wherein said at least one control signal is operable for outputting said first data value on a preselected cycle of said first clock; and
   first and second selection circuitry each having an output respectively coupled to corresponding inputs of said first and second storage devices, said first and second selection circuitry each having a first input operable for receiving a data stream, and a second input coupled to a respective output of said first and second storage devices, wherein said first and second selection circuitry is operable for selecting for outputting a signal on one of said first and second inputs in response to first and second gate signals; wherein said first and second gate signals each have a period twice a period of said first clock, and wherein said second gate signal is a complement of said first gate signal.

5. An interface apparatus comprising:
   a first storage device operable for storing a first set of data values;
   a second storage device operable for storing a second set of data values; and
   circuitry coupled to said first and second storage devices operable for sequentially outputting a first data value from said first storage device and a second data value from said second storage device in response to at least one control signal, wherein said first and second storage devices hold data values for a predetermined number of half-periods of a first clock, wherein said at least one control signal is operable for outputting said first data value on a preselected cycle of said first clock, wherein said circuitry operable for selectively sequentially outputting first and second data values comprises a multiplexer (MUX) having a first input operable for receiving said first data value and a second input operable for receiving said second data value, wherein said MUX selects for outputting one of said first and second data values in response to a select control signal having a period that is a predetermined multiple of a period of said first clock, wherein said period of said select control signal is twice the period of said first clock.

6. An interface apparatus comprising:
   a first storage device operable for storing a first set of data values;
   a second storage device operable for storing a second set of data values; and
   circuitry coupled to said first and second storage devices operable for sequentially outputting a first data value from said first storage device and a second data value from said second storage device in response to at least one control signal, wherein said first and second storage devices hold data values for a predetermined number of half-periods of a first clock, wherein said at least one control signal is operable for outputting said first data value on a preselected cycle of said first clock, wherein said circuitry operable for selectively sequentially outputting first and second data values comprises:
   a first latch having an input operable for receiving said first data value;
   a second latch having an input operable for receiving said second data value; and
   a multiplexer (MUX) having a first input coupled to an output of said first latch and a second input coupled to an output of said second latch, said MUX being operable for selecting for outputting one of said first and second data values in response to a select control signal having a period that is a predetermined multiple of a period of said first clock, and wherein said first and second latch holds data on first and second predetermined levels of said first clock.

7. The apparatus of claim 6 wherein said first storage element comprises a third latch, and said second storage element comprises a fourth latch, said third being a transparent latch holding data on a first predetermined level of a second clock, and said fourth latch being a transparent latch holding data on a level complementary to said first predetermined clock level.

8. The apparatus of claim 7 further comprising second and third MUXs having outputs respectively coupled to said third and fourth latches, said second and third MUXs having a first input operable for receiving a stream of data values, and a second input respectively coupled to an output of said third and fourth latches, said second MUX operable for selecting between said first and second inputs in response to a first gate signal, and said third MUX operable for selecting between said first and second inputs in response to a second sate signal, complementary to said first gate signal.

9. An interface apparatus comprising:
   a plurality, M, of first multiplexers (MUX), each having a first input operable for receiving a data stream, and an output;
   a plurality, M, of first latches, each having an input coupled to an output of a corresponding first MUX, each said first latch having a first output, and a second output coupled to a second input of said corresponding first MUX;
   a plurality, M, of second MUXs, each having a first input operable for receiving said data stream, and an output;
   a plurality, M, of second latches, each second latch comprising a latch pair wherein an input of a first one of said pair is coupled to an output of a corresponding second MUX, and has an output, and a second one of said pair has an input coupled to said output of said first one of said pair, and an output coupled to a second input of said corresponding second MUX;
   a plurality of third latches having an input coupled to said first output of a corresponding one of said first latches, and an output coupled to a corresponding input of a third MUX;
   a plurality of fourth latches having an input coupled to said output of said first one of said latch pair, and an output coupled to a corresponding input of said third MUX, said third MUX operable for outputting a sequence of data values in response to a select control, said select control comprising a plurality, k, of signals, wherein a first signal of said plurality of k signals has a half-period equal to a period of a first clock, wherein said each of said first and second latches is operable in response to a second clock signal having a half-period equal to the period of said first clock, and wherein each of said of third latches is operable in response to said first clock.

10. The apparatus of claim 9 wherein said first clock comprises a local chip clock, and said second clock comprises an input/output (I/O) clock.

11. The apparatus of claim 9 wherein $2^{(k-1)}$ equals M.

12. A method of interfacing integrated circuit devices comprising the steps of:

storing a first set of data values in a first storage element, wherein each data value of said first set is stored for a predetermined number of half-periods of a first clock;

storing a second set of data values in a second set of storage elements wherein each data value of said second set is stored for a predetermined number of half-periods of said first clock;

sequentially outputting a first data value from said first storage device and a second data value from said second storage device in response to at least one control signal, wherein said at least one control signal is operable for outputting said first data value on a preselected cycle of said first clock, wherein said step of sequentially outputting a first data value comprises the step of:

providing a control signal to a first selection circuit coupled to said first and second storage devices, wherein said control signal has a period that is a predetermined multiple of a period of said first clock;

receiving a data stream at an input of a second and third selection circuitry;

outputting each of said first set of data values to said first storage element from said second selection circuitry in response to a first selection signal; and outputting each of said second set of data values to said second storage element from said third selection circuitry in response to a second selection signal;

wherein said first and second selection signals are complementary signals.

13. A method of interfacing integrated circuit devices comprising the steps of:

storing a first set of data values in a first storage element, wherein each data value of said first set is stored for a predetermined number of half-periods of a first clock;

storing a second set of data values in a second set of storage elements wherein each data value of said second set is stored for a predetermined number of half-periods of said first clock;

sequentially outputting a first data value from said first storage device and a second data value from said second storage device in response to at least one control signal, wherein said at least one control signal is operable for outputting said first data value on a preselected cycle of said first clock, wherein said step of sequentially outputting a first data value comprises the step of:

providing a control signal to a first selection circuit coupled to said first and second storage devices, wherein said control signal has a period that is a predetermined multiple of a period of said first clock;

receiving a data stream at an input of a second and third selection circuitry;

outputting each of said first set of data values to said first storage element from said second selection circuitry in response to a first selection signal; and outputting each of said second set of data values to said second storage element from said third selection circuitry in response to a second selection signal;

wherein said first and second selection signals have a period that is twice a period of a period of said first clock.

14. A method of interfacing integrated circuit devices comprising the steps of:

storing a first set of data values in a first storage element, wherein each data value of said first set is stored for a predetermined number of half-periods of a first clock;

storing a second set of data values in a second set of storage elements wherein each data value of said second set is stored for a predetermined number of half-periods of said first clock;

sequentially outputting a first data value from said first storage device and a second data value from said second storage device in response to at least one control signal, wherein said at least one control signal is operable for outputting said first data value on a preselected cycle of said first clock, wherein said step of sequentially outputting a first data value comprises the step of:

providing a control signal to a first selection circuit coupled to said first and second storage devices, wherein said control signal has a period that is a predetermined multiple of a period of said first clock;

receiving a data stream at an input of a second and third selection circuitry;

outputting each of said first set of data values to said first storage element from said second selection circuitry in response to a first selection signal;

outputting each of said second set of data values to said second storage element from said third selection circuitry in response to a second selection signal; and initializing said first and second selection signals in response to a latency of a signal path operable for communicating said data stream.

15. The method of claim 14 wherein said step of initializing said first and second selection signals comprises the steps of:

sending a preselected data stream; and adjusting a phase of each said first and second selection signals in response to said preselected data stream.

16. The method of claim 15 wherein said step of adjusting each phase of each of said selection signals further includes the step of selecting a phase wherein a first predetermined data value in said data stream is captured in said first storage element and a second predetermined data value is captured in said second storage element.

17. The method of claim 15 wherein said data stream comprises a synchronization (sync) pattern.

18. A data processing system comprising:

a first data processing device; and a second data processing device coupled to said first data processing device via an elastic interface, said elastic interface comprising:

a first storage device operable for storing a first set of data values;

a second storage device operable for storing a second set of data values; and circuitry coupled to said first and second storage devices operable for sequentially outputting a first data value from said first storage device and a second data value from said second storage device in response to at least one control signal, wherein said first and second storage devices hold data values for a predetermined number of cycles of a first clock.

19. The data processing system of claim 18 wherein said first storage device latches data on a first predetermined edge of a second clock, and said second storage device latches data on a second predetermined edge of said second clock.

20. The data processing system of claim 18 wherein said elastic interface further comprises first and second selection circuitry each having an output respectively coupled to corresponding inputs of said first and second storage devices, said first and second selection circuitry each having a first input operable for receiving a data stream, and a second input coupled to a respective output of said first and second storage devices, wherein said first and second selection circuitry is operable for selecting for outputting a signal on one of said first and second inputs in response to first and second control signals.

21. The data processing system of claim 20 wherein said first and second selection circuitry respectively comprise first and second multiplexers.

22. The data processing system of claim 18 wherein said circuitry operable for selectively sequentially outputting first and second data values comprises a multiplexer (MUX) having a first input operable for receiving said first data value and a second input operable for receiving said second data value, wherein said MUX selects for outputting one of said first and second data values in response to a select control signal having a period that is a predetermined multiple of a period of said first clock.

23. The data processing system of claim 18 wherein said circuitry operable for selectively sequentially outputting first and second data values comprises:
a first latch having an input operable for receiving said first data value;
a second latch having an input operable for receiving said second data value; and
a multiplexer (MUX) having a first input coupled to an output of said first latch and a second input coupled to an output of said second latch, said MUX being operable for selecting for outputting one of said first and second data values in response to a select control signal having a period that is a predetermined multiple of a period of said first clock, and wherein said first and second holds latch data on first and second predetermined levels of said first clock.

24. The apparatus of claim 23 wherein said first storage element comprises a third latch, and said second storage element comprises a fourth latch, said third being a transparent latch holding data on a first predetermined level of a second clock, and said fourth latch being a transparent latch holding data on a level complementary to said first predetermined clock level.

25. The data processing system of claim 24 further comprising second and third MUXs having outputs respectively coupled to said third and fourth latches, said second and third MUXs having a first input operable for receiving a stream of data values, and a second input respectively coupled to an output of said third and fourth latches, said second MUX operable for selecting between said first and second inputs in response to a first gate signal, and said third MUX operable for selecting between first and second inputs in response to a second gate signal, complementary to said first gate signal.

26. The data processing system of claim 18 wherein said second data processing device comprises a central processing unit (CPU).

27. The data processing system of claim 18 wherein said second data processing device comprises a memory device.

28. An interface apparatus comprising:
a first storage device operable for storing a first set of data values;
a second storage device operable for storing a second set of data values;
circuitry coupled to said first and second storage devices operable for sequentially outputting a first data value from said first storage device, and a second data value from said second storage device in response to at least one control signal, wherein said first and second storage devices hold data values for a predetermined number of half-periods of a first clock, and wherein said at least one control signal is operable for outputting said first data value on a preselected cycle of said first clock, said preselected cycle of said first clock associated with a latency of a signal path operable for communicating said first set of data values and said second set of data values.

29. A method of interfacing integrated circuit devices comprising the steps of:
storing a first set of values in a first storage element, wherein each value of said first set is stored for a predetermined number of half-periods of a first clock;
storing a second set of data values in a second set of storage elements wherein each data value of said second set is stored for a predetermined number of half-periods of said first clock; and
sequentially outputting a first data value from said first storage device and a second data value from said second storage device in response to at least one control signal wherein said at least one control signal is operable for outputting said first data value on a preselected cycle of said first clock, said preselected cycle of said first clock associated with a latency of a signal path operable for communicating said first set of data values and said second set of data values.

* * * * *

UNITED STATES PATENT AND TRADEMARK OFFICE
CERTIFICATE OF CORRECTION

PATENT NO. : 6,334,163 B1
DATED : December 25, 2001
INVENTOR(S) : Daniel Mark Dreps, Frank David Ferraiolo and Kevin Charles Gower It is certified that error appears in the above-identified patent and that said Letters Patent is hereby corrected as shown below:

Column 2,
Line 56, replace "$T_2$" with -- $t_2$ --.

Column 7,
Line 50, replace "12" with -- $t_2$ --.

Column 14,
Line 4, replace "S(O)" with -- S(0) --.
Line 6, replace "S(O)" with -- S(0) --.
Line 63, after "latches" insert -- data --.

Signed and Sealed this

Sixteenth Day of July, 2002

Attest:

JAMES E. ROGAN
Attesting Officer
Director of the United States Patent and Trademark Office